(12) United States Patent
Jordan et al.

(10) Patent No.: US 9,381,869 B2
(45) Date of Patent: *Jul. 5, 2016

(54) ACCESSORY MOUNTING ASSEMBLY

(71) Applicant: SOUTHERN AUDIO SERVICES, INC., Baton Rouge, LA (US)

(72) Inventors: Jeff B. Jordan, Baton Rouge, LA (US); Jon C. Jordan, Baton Rouge, LA (US)

(73) Assignee: Southern Audio Services, Inc., Baton Rouge, LA (US)

( * ) Notice: Subject to any disclaimer, the term of this patent is extended or adjusted under 35 U.S.C. 154(b) by 350 days.

This patent is subject to a terminal disclaimer.

(21) Appl. No.: 14/058,359

(22) Filed: Oct. 21, 2013

(65) Prior Publication Data
US 2014/0199859 A1 Jul. 17, 2014

Related U.S. Application Data

(63) Continuation of application No. 13/867,681, filed on Apr. 22, 2013, now Pat. No. 9,050,936.

(51) Int. Cl.
| *B60R 11/00* | (2006.01) |
| *F16M 11/16* | (2006.01) |
| *F16M 13/02* | (2006.01) |
| *B63B 35/81* | (2006.01) |
| *B60Q 1/04* | (2006.01) |
| *B60Q 1/24* | (2006.01) |

(52) U.S. Cl.
CPC .............. *B60R 11/00* (2013.01); *B60Q 1/0483* (2013.01); *B60Q 1/24* (2013.01); *B63B 35/816* (2013.01); *F16M 11/16* (2013.01); *F16M 13/02* (2013.01)

(58) Field of Classification Search
CPC .... B63B 35/816; B63B 35/815; B63B 21/56; B63B 17/00; B63B 35/731; B63B 25/002; B63B 17/04; B63B 15/00; B63B 45/00; B63B 45/04
USPC .......................................... 114/253, 343, 364
See application file for complete search history.

(56) References Cited

U.S. PATENT DOCUMENTS

| 4,692,845 | A | 9/1987 | Widhalm et al. |
| 5,450,296 | A | 9/1995 | McHugh |
| 5,481,441 | A | 1/1996 | Stevens |
| 6,848,854 | B2 | 2/2005 | Masse |
| 7,303,320 | B1 | 12/2007 | Ashley |
| 2012/0152162 | A1 | 6/2012 | Jordan |

*Primary Examiner* — Lars A Olson
(74) *Attorney, Agent, or Firm* — Roy Kiesel Ford Doody & Thurmon

(57) ABSTRACT

An assembly for mounting an accessory to a support structure. The assembly can be configured to permit the accessory to pan, rotate or tilt. The assembly includes a mounting member attachable to the support structure and having a mounting member electrical connector. The assembly also includes a docking member releasably attached to the mounting member and having a docking member electrical connector communicably coupled to the mounting member electrical connector. The accessory is attached to the docking member.

20 Claims, 29 Drawing Sheets

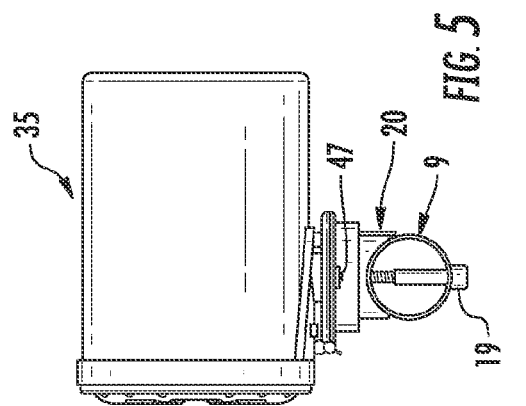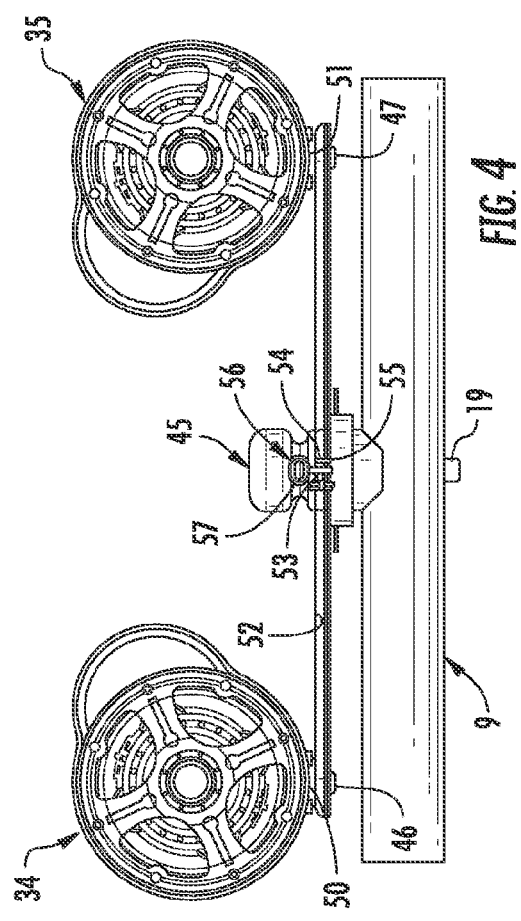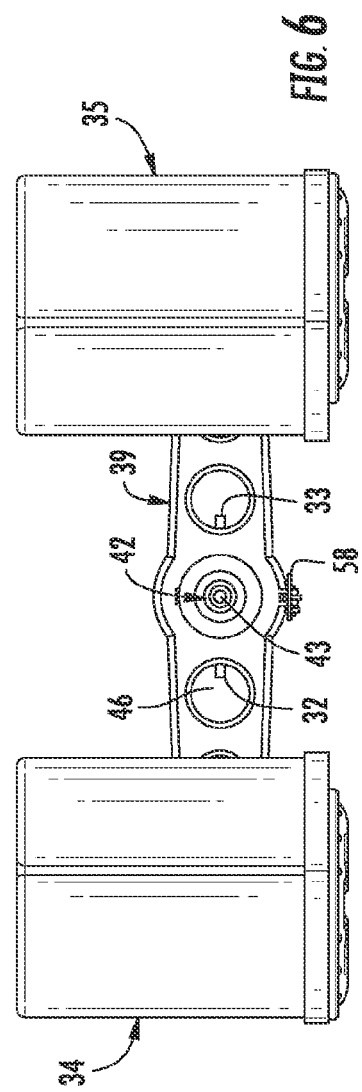

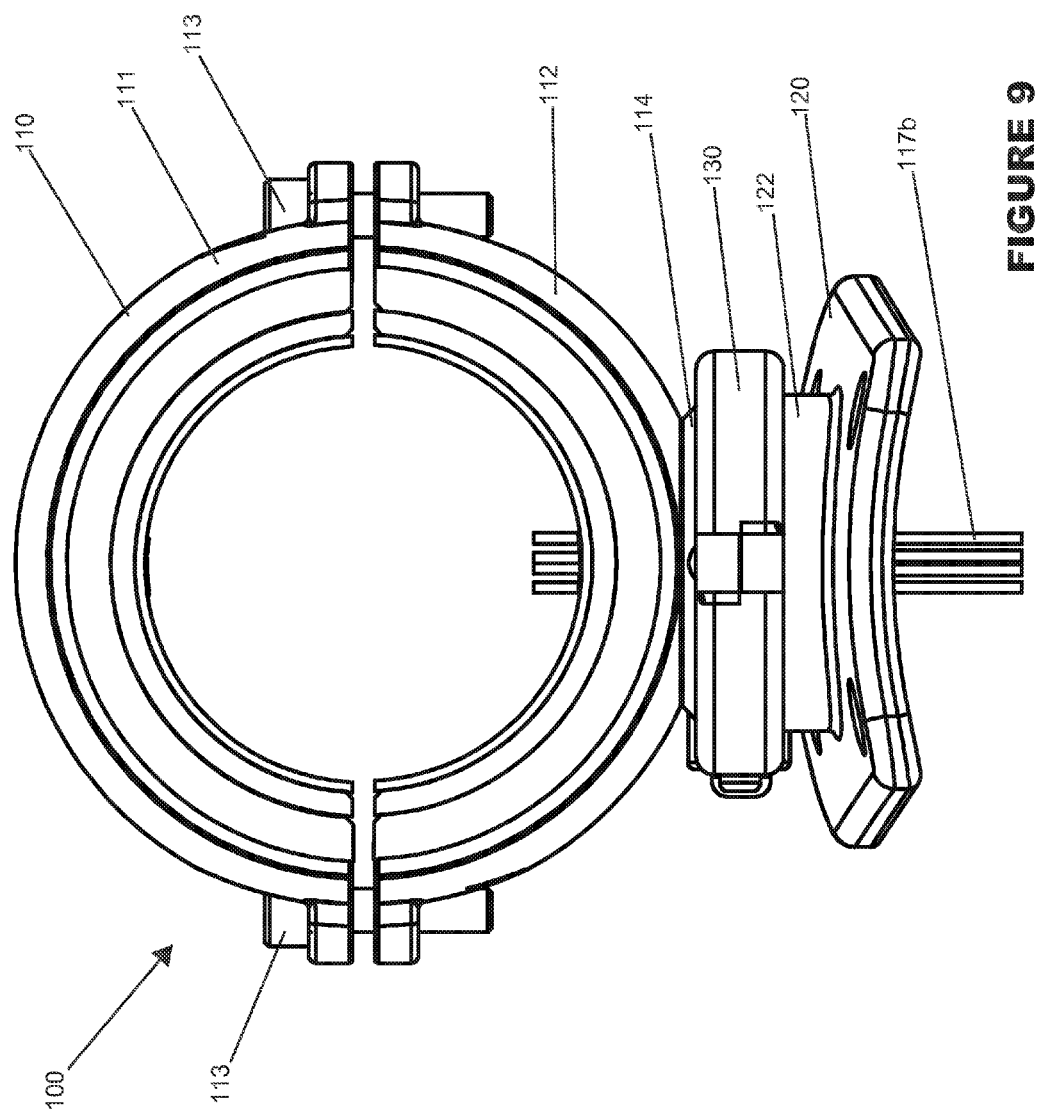

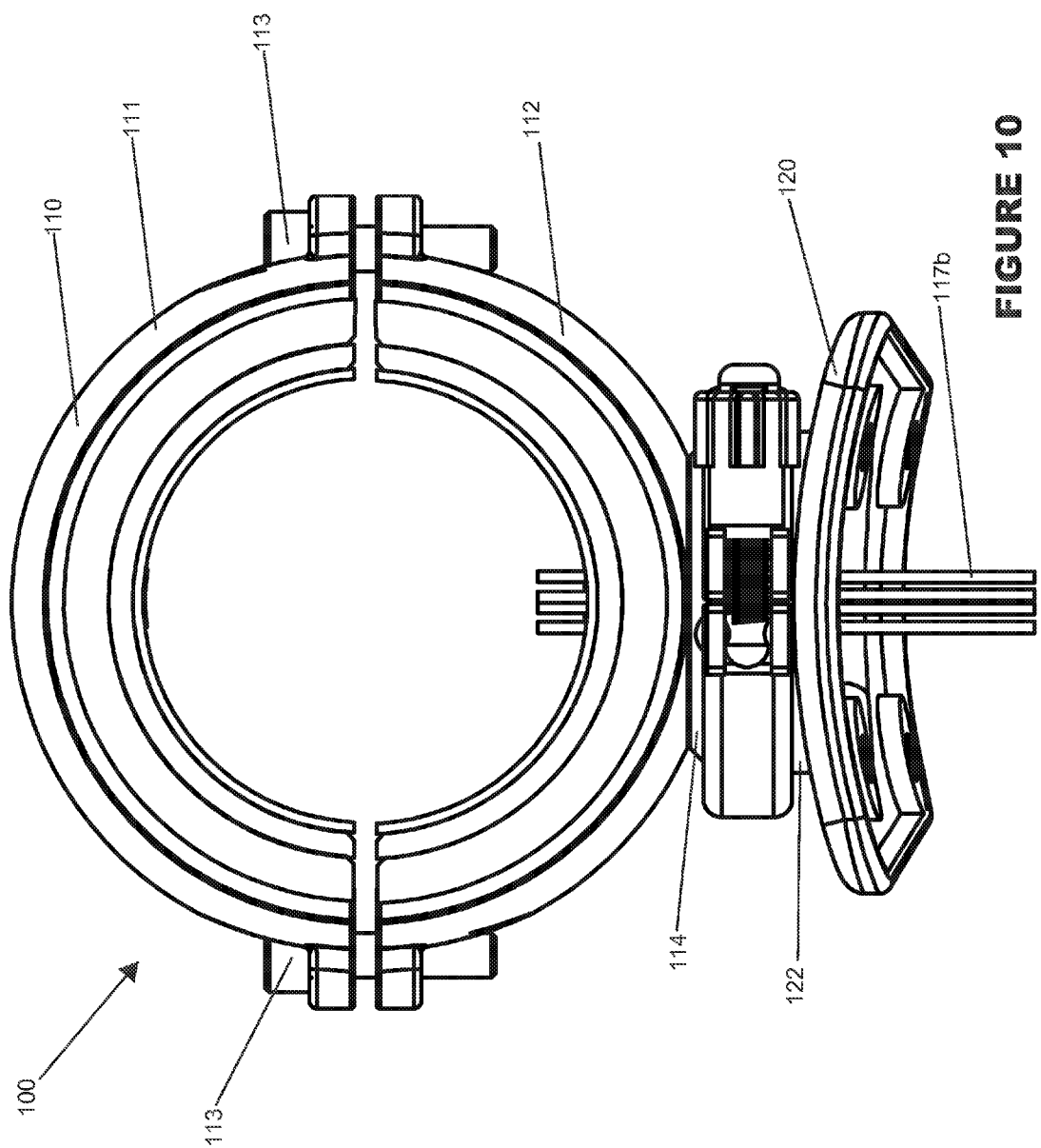

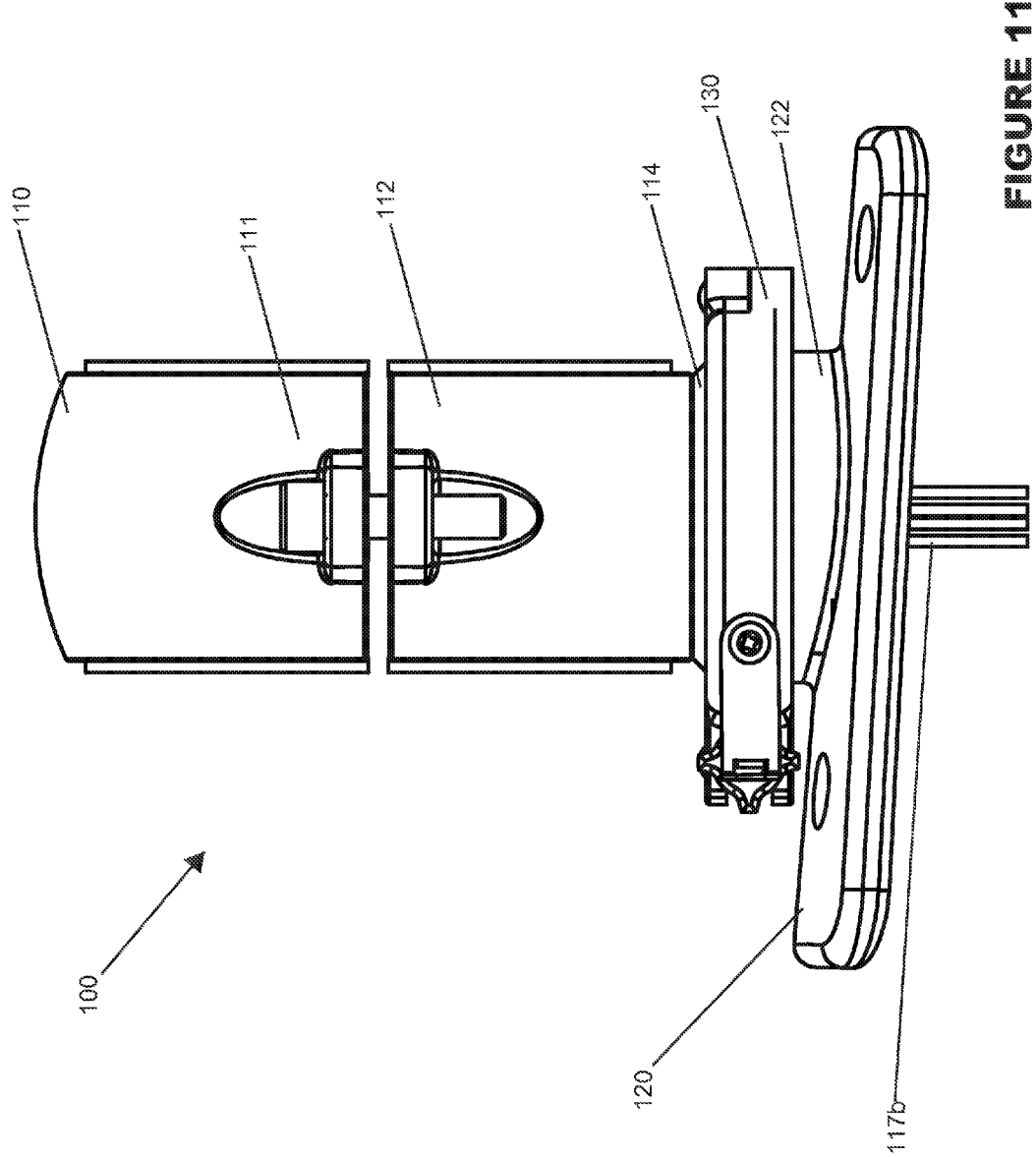

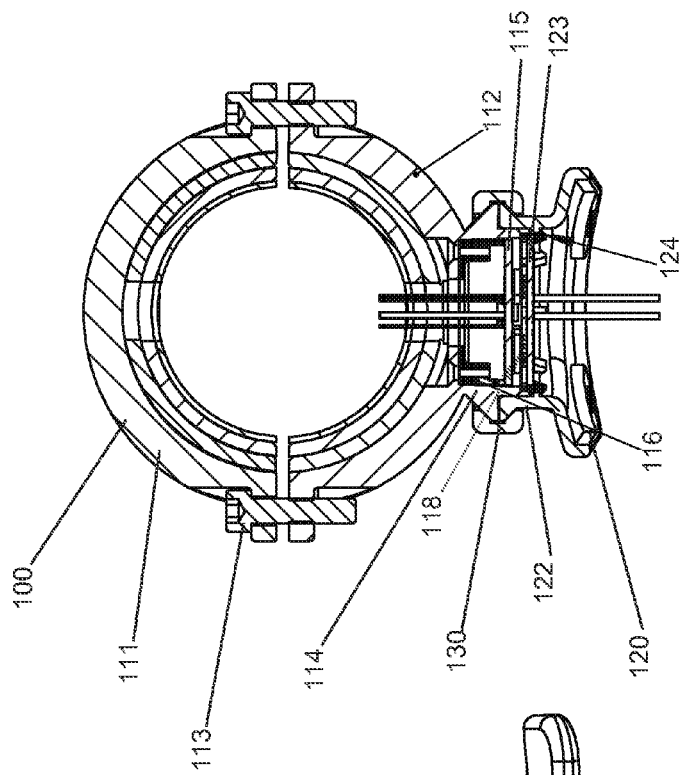
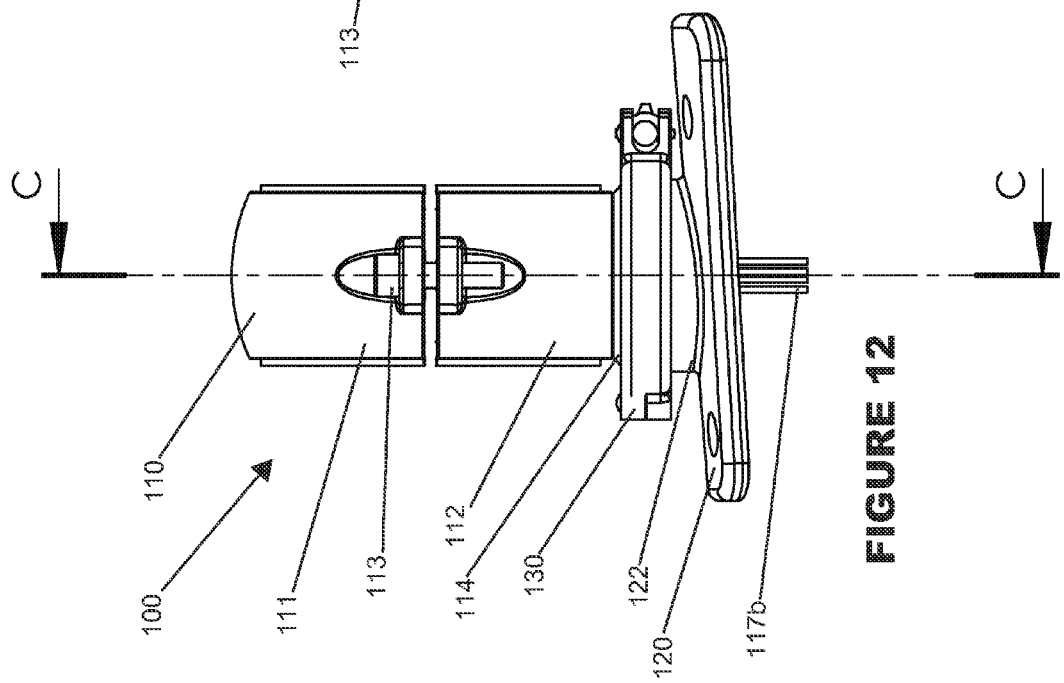

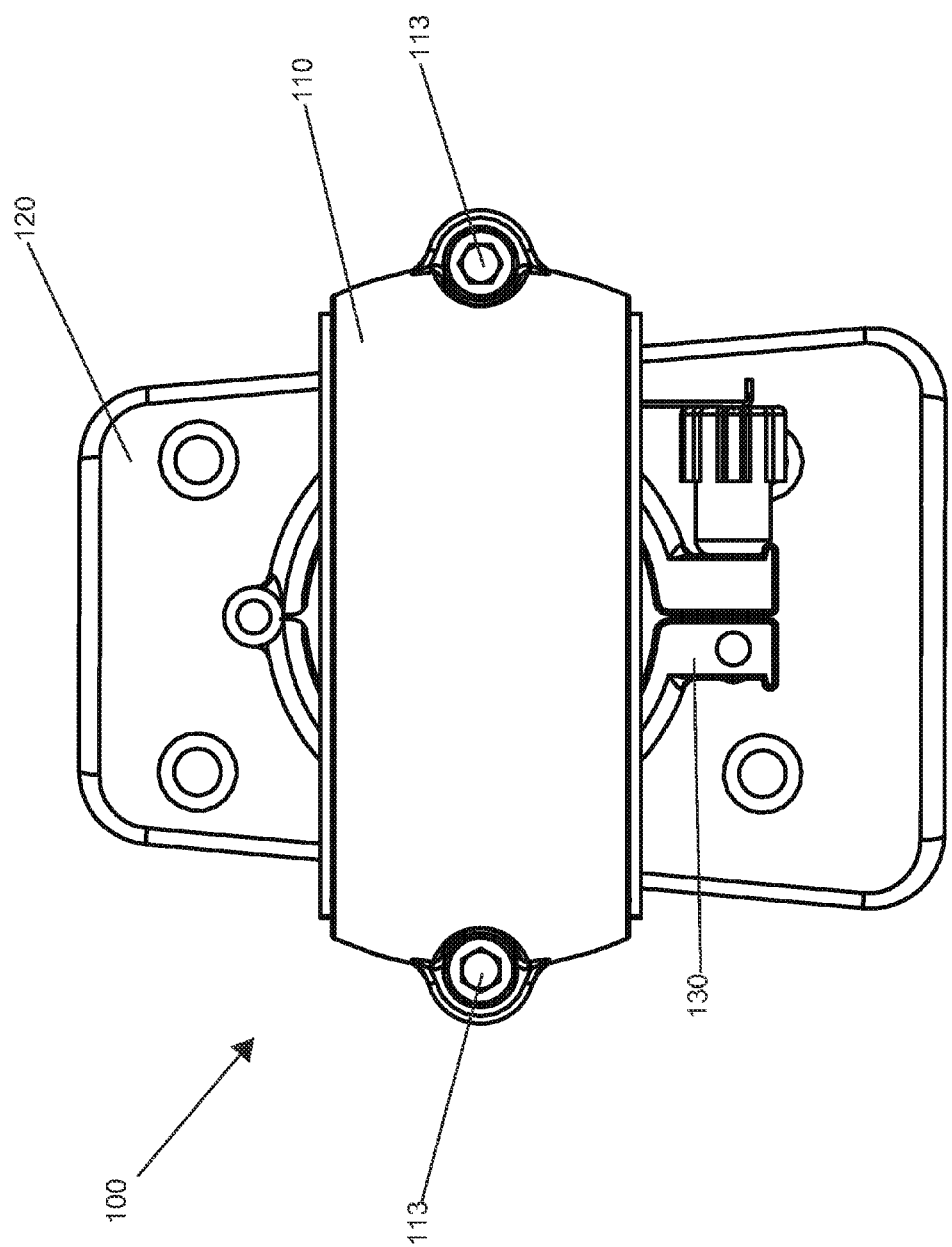

ACCESSORY MOUNTING ASSEMBLY

CROSS-REFERENCE TO RELATED APPLICATION

This application is a continuation-in-part of U.S. application Ser. No. 13/867,681, filed Apr. 22, 2013, which is a continuation-in-part of U.S. application Ser. No. 12/971,027, filed Dec. 17, 2010, now U.S. Pat. No. 8,459,197.

BACKGROUND OF THE INVENTION

1. Field of the Invention

This invention relates in general to an accessory that can be mounted on a boat tower or tow pylon, and more particularly to an accessory mountable on a boat tower to track the position of a person being towed by the boat.

2. Description of Related Art

To enhance the experience of a water skier, water boarder, or water rafter being towed behind a boat it is common to attach the tether to a tower that has been constructed to extend above the boat. Typically, these towers extend 3 to 10 feet about the boat bow and have the tether attached to a post or fixed ring positioned at or near the top of the tower. Examples of such towers are illustrated in U.S. Pat. Nos. 5,788,133, 6,575,112, 6,997,131, and 7,299,761, as well as in U.S. Published Patent Application Nos. 2008/0289561, 2004/0159278 and 2002/0046690.

It is also well known that one can affix lights, audio speakers and other accessories to the boat towers to help guide the boat at dusk or night, as well as to enhance the boating experience when not towing persons. An example of such use is illustrated in U.S. Pat. Nos. 7,017,509 and 7,007,904, as well as in U.S. Published Patent Application Nos. 2008/0049958, 2007/0062992, and 2006/0037527.

However, there remain several problems that current towing assemblies do not address. One is the ability of the person being towed having a heightened experience by being able to clearly hear music while being towed. Another is the ability of the driver who must face forward to steer the boat to know where the towed person is positioned behind the boat. In competitive or pleasure performances this can result in the boat being steered to sharply veer in the direction of the towed person resulting in slacking of the tether and slowing of the speed of the towed person. When this occurs the towed person may not be able to successfully launch from a ramp or perform other water tricks. Another problem is communication between the boat driver and the towed person. Still another problem is coordinating the timing between the boat driver and towed person when steering or accelerating the boat. Yet another problem is highlighting the towed person at dusk or at night. Still further, problems occur when the tow boat is used as the lighting and sound center when the boat is docked.

BRIEF SUMMARY OF THE INVENTION

Therefore, one object of this invention is to provide an assembly attachable to a boat tower or towing pylon that can track the lateral movements of the towed person and direct speakers to track the lateral movements to provide the towed person to hear a clear and sharp sound being emitted from the speakers. Another object of the invention is to provide an assembly attachable to a boat tower or towing pylon that can track the lateral movements of the towed person and electronically relay to a monitor the position of the towed person. Still another object of this invention is to provide an assembly attachable to a boat tower or towing pylon and provided with lights that can be directed toward the towed person position. Yet another object of this invention is to provide an assembly that can provide one or more of the above objects of this invention and when the boat is docked permit the speakers and lights to be independently or dependently directed toward a desired position.

Still a further object of this invention is to provide an accessory mounting assembly that can permit an accessory (e.g. one or more speakers, lights, cameras, combinations thereof) to be to be independently or dependently directed toward a desired position. Yet another object of this invention is to provide an accessory mounting assembly that can permit an accessory to be easily attached or detached from the accessory mounting assembly. Other objects and advantages of this invention shall become apparent from the ensuing descriptions of the invention.

Accordingly, this invention in one embodiment comprises an accessory mounting assembly for mounting an accessory to a support structure. The assembly can be configured to permit the accessory to pan, rotate or tilt. The assembly can also be configured to permit the accessory to be releasably attached to the assembly. The assembly includes a mounting member attachable to the support structure and having a mounting member electrical connector. The assembly also includes a docking member releasably attached to the mounting member and having a docking member electrical connector communicably coupled to the mounting member electrical connector. The accessory is attached to the docking member.

Additionally, the foregoing has outlined rather broadly the features and technical advantages of the present invention in order that the detailed description of the invention that follows may be understood. Additional features and advantages of the invention will be described hereinafter, which form the subject of the claims of the invention. It should be appreciated by those skilled in the art that the conception and specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features, which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE SEVERAL VIEWS OF THE DRAWINGS

The accompanying drawings illustrate various embodiments of this invention. However, it is to be understood that these embodiments are not intended to be exhaustive, nor limiting of the invention. These embodiments are but examples of some of the forms in which the invention may be practiced.

FIG. 4 is a frontal view of the FIG. 3 embodiment of the invention to which speakers have been attached.

FIG. 5 is a side view of FIG. 3.

FIG. 6 is a top view of FIG. 3.

FIG. 9 is a front view of FIG. 8.

FIG. 10 is a rear view of FIG. 8.

FIG. 11 is a left side view of FIG. 8

FIG. 12 is a right side view of FIG. 8.

FIG. 13 is a cross-sectional view along C-C of FIG. 12.

FIG. 14 is a top view of FIG. 8.

DETAILED DESCRIPTION OF THE INVENTION

Without any intent to limit the scope of this invention, reference is made to the Figures in describing the embodiments of the invention. Although the invention is described when used to tow a skier behind a ski boat, the invention can also be used to a person on a water board, a rubber inner tube, a raft, or similar device.

Figure 1:
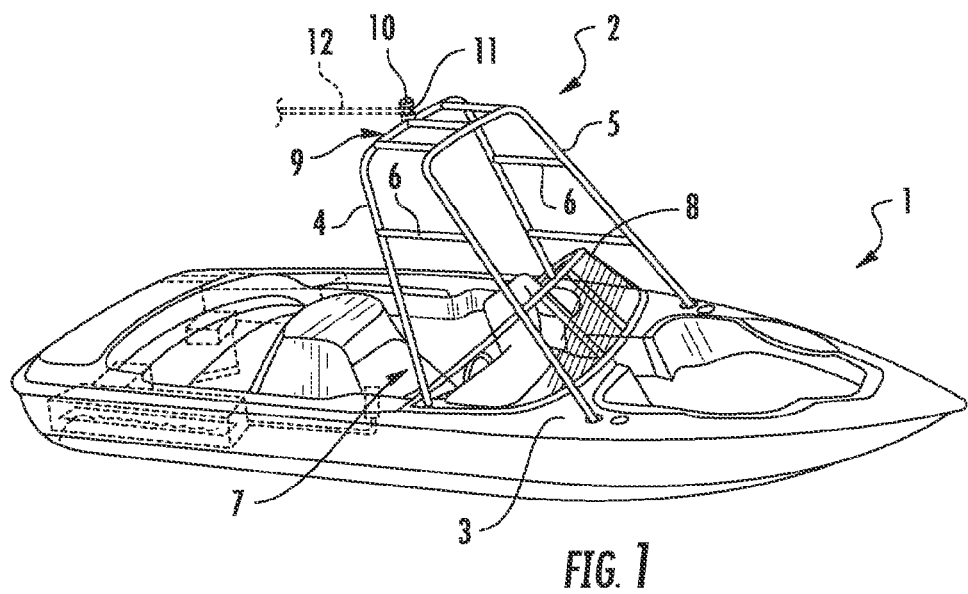
FIG. 1A illustrates a typical tow rope attaching post structure used in FIG. 1.
Figure 1A:
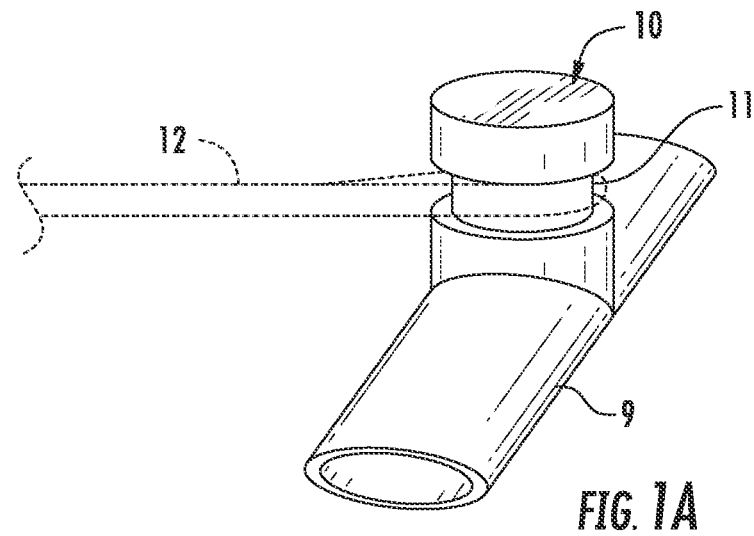

Referring now to FIG. 1, a typical ski boat 1 is illustrated having tower 2 affixed to boat decking structure 3. Tower 2 is constructed generally of two U-shaped tubular members 4 and 5 and fixed in position relative to one another by horizontal tubular members 6 to form a rigid structure. Typically, tower 2 will be positioned over boat cockpit 7 and extend over each side of front windshield 8 so as to center the weight of tower 2 evenly over the width of boat 1 to allow for better handling of boat 1 when towing a skier (not shown). Referring now to FIGS. 1 and 1A, affixed to top center section 9 of member 4 is cylindrical post 10 having indented section 11 encircling post 10. A tow rope or tether 12 having a looped end is fitted over post 10 and into indented section 11 when boat 1 will be used to tow a skier.

Figure 2:
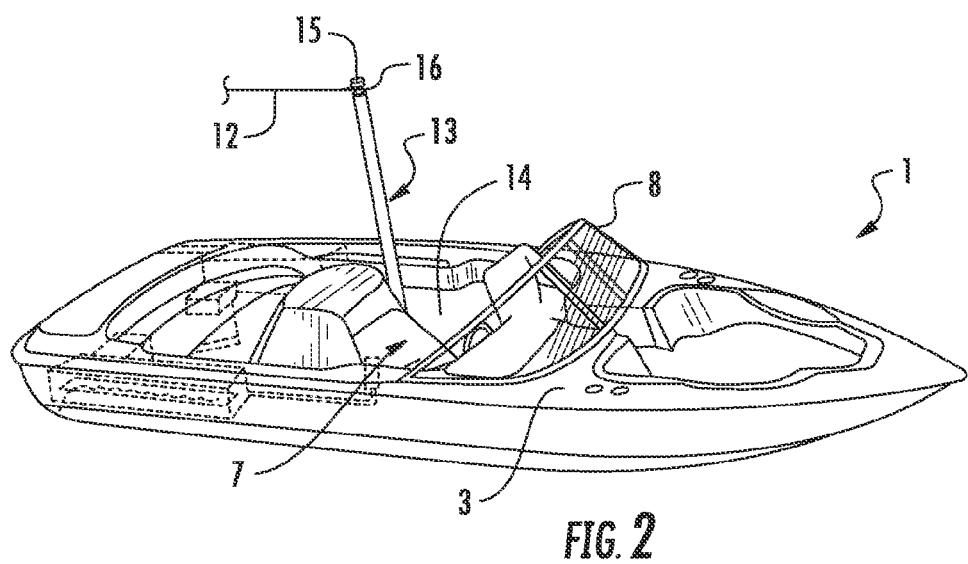
FIG. 2 illustrates an alternate embodiment of a typical ski boat provided with a towing pylon to assist in towing a skier.
Figure 2A:
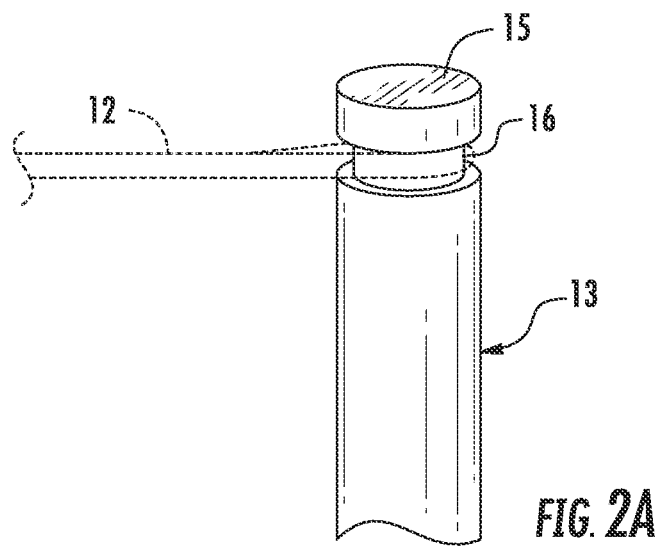
FIG. 2A illustrates a typical tow rope attaching post structure used in FIG. 2.
Figure 3:
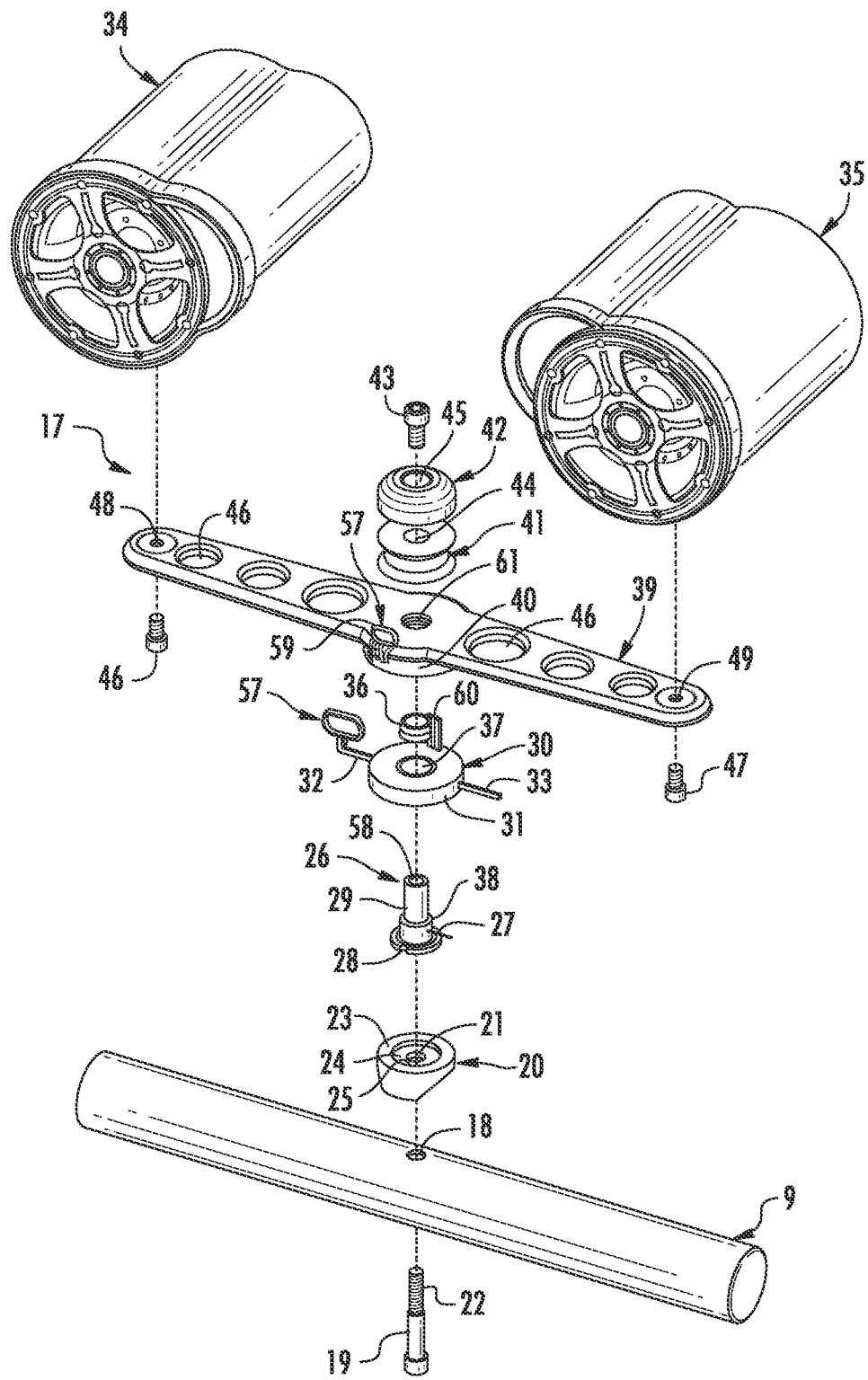
FIG. 3 is an exploded view of an embodiment of the tow rope attachment and accessory rack of this invention.

FIG. 2 illustrates a similar ski boat 1 which instead of having tower 2 is provided with a pylon 13 fixed to boat floor 14 and extending upward so that its upper end 15 (see FIG. 2A) is positioned sufficiently above the boat floor 14 to permit tow rope or tether 12 to be attached in indented section 16 circling and located at upper end 15 of pylon 13 and extend to the skier (not shown) without touching boat deck 3 when the skier is being towed.

This invention involves an improvement to these conventional tow rope attachment structures. FIG. 3 thru 6 illustrate the ski rope attachment and accessories rack 17 that is attachable to top center section 9 of tower 2. To facilitate the attachment, tower bar section 9 is drilled to provide aligned bolt openings 18 sized to permit bolt 19 to pass through section 9 to attach to tower bar diameter adaptor 20. Adaptor 20 is preferably shaped and sized to sit flush on section 9. In addition adaptor 20 is provided with an opening 21 extending vertically through adaptor 20 and is sized to allow the threaded end 22 of bolt 19 to thread into spindle insert 26 thereby compressibly affixing adaptor 20 to section 9. The upper surface 23 of adaptor 20 is provided with a cavity 24 provided with a key 25 to receive a universal spindle insert 26 having a bottom flange 27 provided with a notch 28 sized to permit key 25 to be positioned in notch 28. Flange 27 is sized to fit within cavity 24 in a manner that prevents flange 27 from rotating. Insert 26 has a hollow threaded spindle 29 extending vertically upward from flange 27. Fitted about spindle 29 is a disc-shaped signal or power commutator 30 to permit a full 360° rotation of arm 39. Extending from its edge surface 31 are electrical input lines 32 and 33 that can be connected to audio speakers 34 and 35, respectively through output line 61. Wear bushing 36 rests on top of the mid-flange 38 of spindle 29.

Elongated, hollow arm 39 has lower shroud 40 that fits over commutator 30 and is provided with a cavity to receive bushing 36 about which arm 39 rotates. Arm 39 is also provided with a threaded opening 61 positioned about its vertical center axis through which spindle 29 extends. Tow rope spool 41 and locking cap 42 are then positioned on spindle 29 and held fixed to arm 39 by bolt 43 that extends through aligned openings 44 and 45 of spool 41 and cap 42, respectively, and is screwed into threaded opening 58 of spindle 29. In one embodiment, arm 39 will be provided with a hollow cavity or channel that extends from shroud 40 to each end of arm 39 where speakers 34 and 35 will be attached. This will permit wires attaching the speakers 34 and 35 to an audio receiver or other audio source located in the boat cockpit to be positioned out of sight and better protected from the weather. If desired, arm 39 may have one or more openings 46 formed to reduce the weight of arm 39 to allow it to rotate about bushing 36 more easily.

Speakers 34 and 35 can be bolted to arm 39 by bolts 46 and 47, respectively, which pass through arm openings 48 and 49, respectively and into threaded openings in speaker support brackets 50 and 51, respectively. The speakers 34 and 35 may be mounted above or hang below arm 39. Affixed to the center front edge 52 of arm 39 are two spaced apart, parallel shoulder members 53 and 54 having a horizontally positioned axle 55 extending between the two members. Pivotally mounted on axle 55 is rope guide 56. Guide 56 has ring structure 57 through which a tow rope can pass. It is noted guide 56 does not have to be a ring structure, but could be pin or other structure having an opening though which the tow rope 12 can pass and be secured. However, these other structures must be designed so that the lateral movement of the tow rope 12 will cause arm 39 to track the tow rope 12 movement.

In operation, the end of tow rope 12 is passed through ring 57 and then looped and fixed around rope spool 41. The opposite end of tow rope 12 is provided with at least one handle that is held by the skier when being towed. As a skier moves to the side of ski boat 1 the tow rope 12 contacts one of the ring structure 57 and causes arm 39 to be turned in the direction of the skier. Commutator 30 may be provided with a magnetic or optical encoder (not shown) or other similar device that provides digital or analog pulses that correspond to the angle at which arm 39 has turned. These pulses are reduced to a digital signal by known means and transmitted to a processor, preferably positioned in cockpit 7 or elsewhere protected from the weather, which electronically processes the signal to provide a visual image on a monitor indicating the position of the skier relative to the boat. The monitor is preferably positioned in cockpit 7 where the boat driver can readily see the monitor.

In addition to mounting speakers on arm 39, one can mount other accessories such as lights and video cameras. In the event a video camera is mounted on arm 39, the video camera can be operatively connected to the monitor to permit the boat driver or passengers to view the skier performing tricks.

In another embodiment, locking means will be affixed to arm 39 that will permit arm 39 to be locked in one of multiple positions. This feature will be beneficial when the ski boat is tied to dock and it is desired to direct the speakers or lights in a fixed direction or when the boat is being operated without a skier other device in tow. In this embodiment, the movement of speakers 34 and 35 when the boat is docked or when no skier is being towed can be controlled by separate motors that are operatively attached to the speakers to pan or tilt the speakers in a desired direction.

In another embodiment, an accessory mounting assembly 100 can be used to mount an accessory (e.g. one or more speakers, lights, cameras, combinations thereof, etc.) can be mounted to a support structure. The accessory mounting assembly 100 is configured to permit the accessory to pan, swivel or tilt in a desired direction. The accessory mounting assembly 100 can also be configured to permit 360° rotation of the accessory. The support structure should be configured to support the weight of the accessory mounting assembly 100 as well as the accessory. Examples of suitable support structures include a boat, boat tower, motor vehicle such as a truck or car, building wall or ceiling, and so forth.

Figure 7:
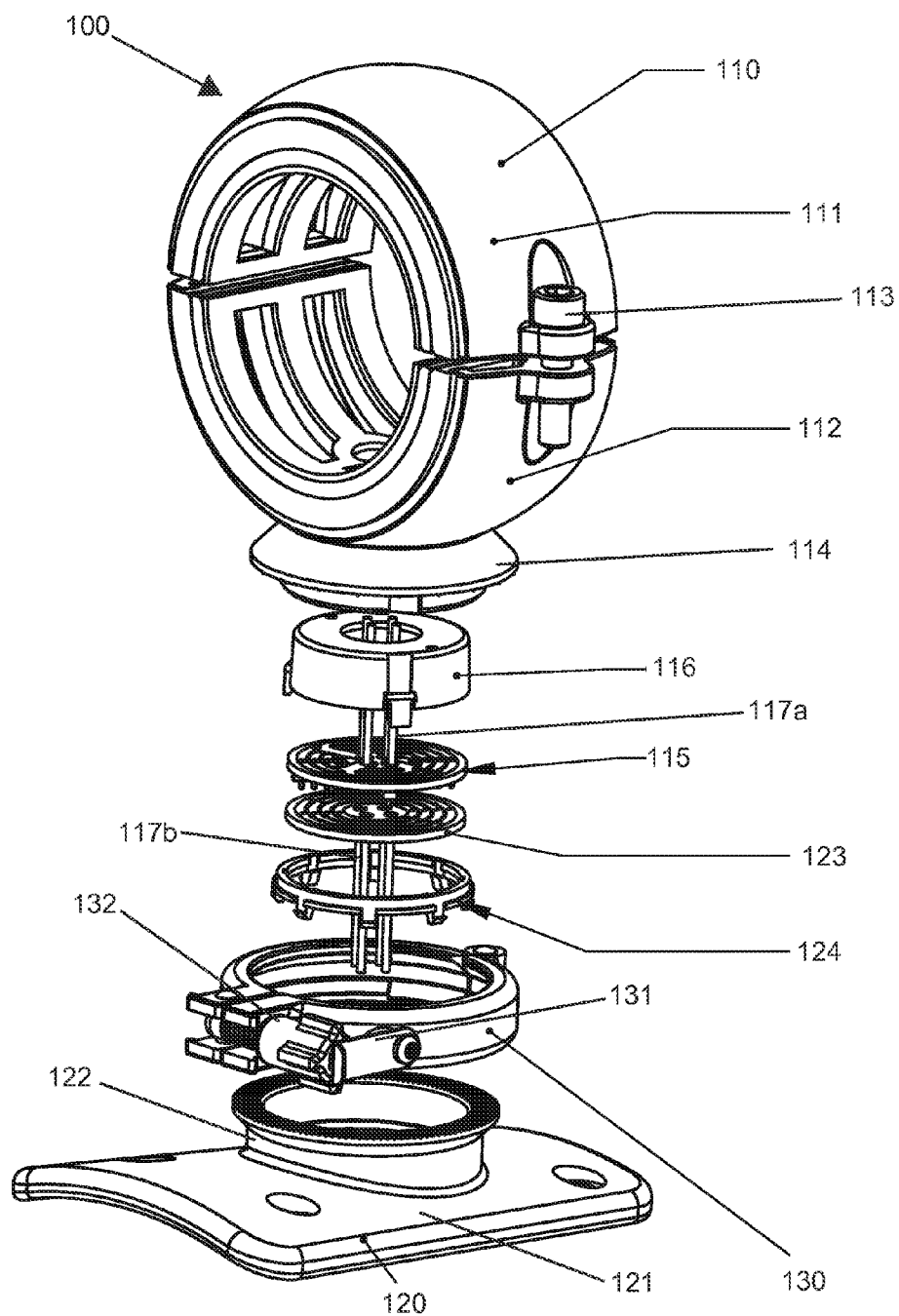
FIG. 7 is an exploded view of FIG. 8.

With reference to FIGS. 7-19, the accessory mounting assembly 100 comprises a mounting member 110 and a docking member 120. The mounting member 110 is configured to attach to the support structure. The mounting member also includes a first connector 114 configured to releasably attach the mounting member 110 to the docking member 120. As shown in FIG. 7, the mounting member 110 can be a clamp configured for attaching the accessory mounting assembly to the structure such as a tubular boat tower or vehicle roll bar. The clamp can have an upper clamp bracket 111 and lower clamp bracket 112.

In an alternate embodiment shown in FIGS. 20-24, the mounting member 110 can be a base plate or surface mount 125 and be attached to the support structure (e.g. a flat surface such as wall, floor, deck, ceiling, and so forth) with a fastener 113 (e.g. nuts and bolts, pins, screws, and so forth). The mounting member 110 may also include an optional backup surface mount 128 that would be installed behind the mounting surface to add strength to the connection as appropriate. A gasket 129 may be provided between the mounting surface 140 and base plate 125 to reduce vibrations. In this embodiment, the mounting member 110 is hingedly connected to the first connector 114 to permit the first connector 114 to rock or pivot back and forth. The hinged connection can be accomplished by providing the base plate or surface mount 125 with connection shoulders 126a, 126b that mate with corresponding connection arms 127a, 127b on the first connector 114. The connection shoulders 126a, 126b and arms 127a, 127b may be secured together using a fastener 113. One of the connection arms 127b may be removable to permit easy assembly and pivot release. Alternatively, the connection shoulders 126a, 126b can be located on the first connector and the connection arms 127a, 127b can be located on the base plate or surface mount 125.

Figure 31:
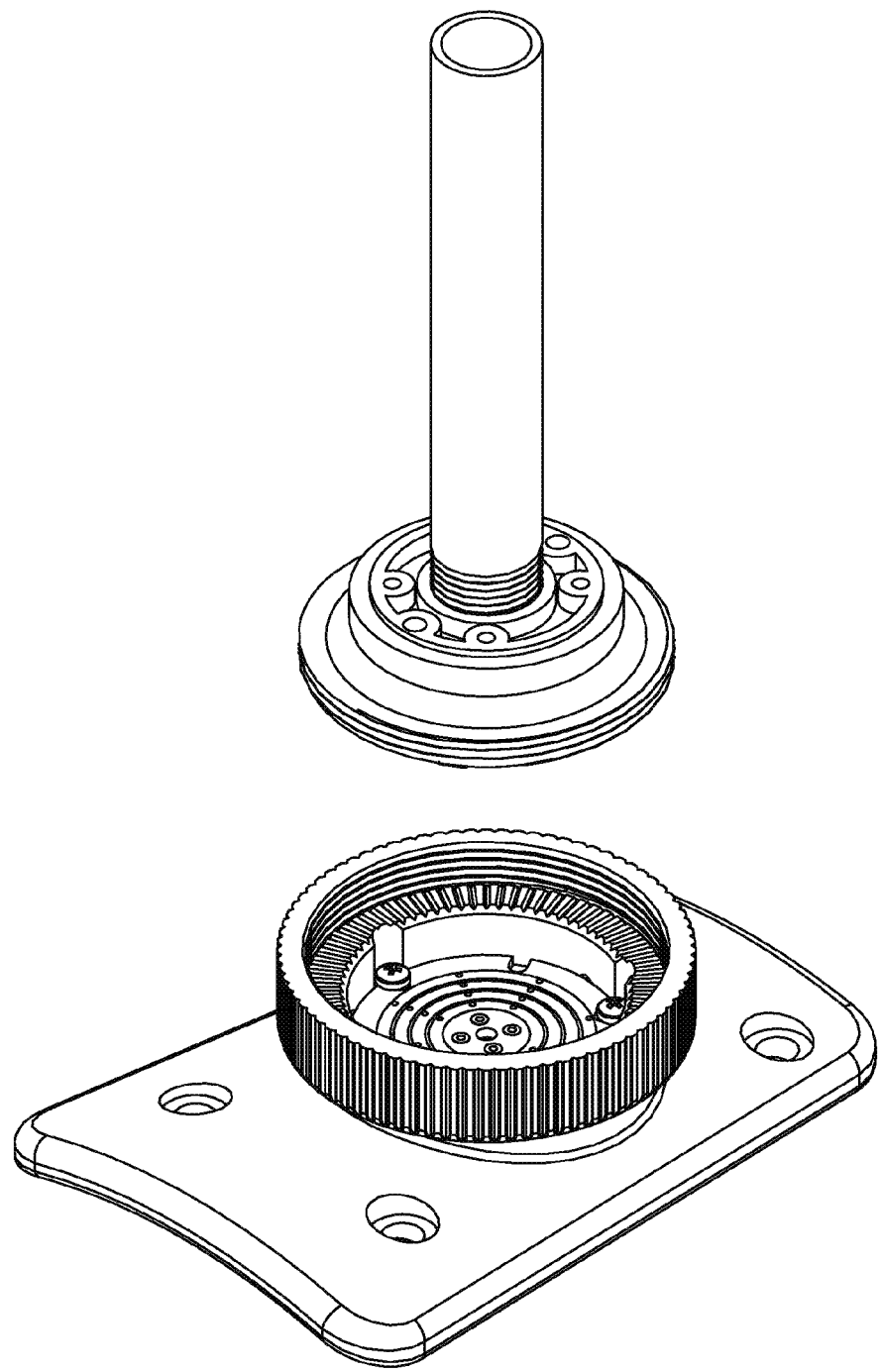
FIGS. 31-33 depict alternative embodiments of the mounting member.
Figure 32:
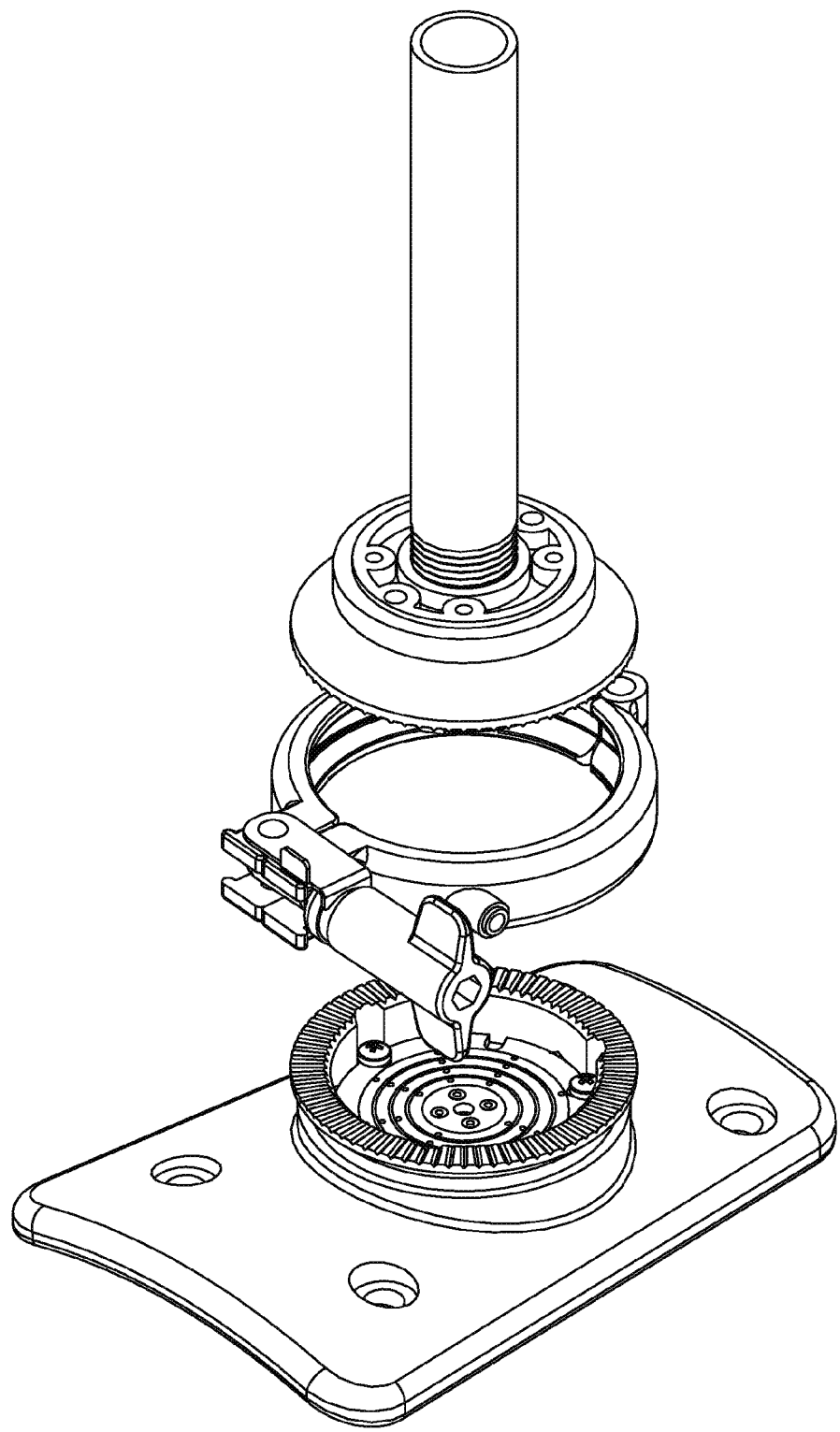
Figure 33:
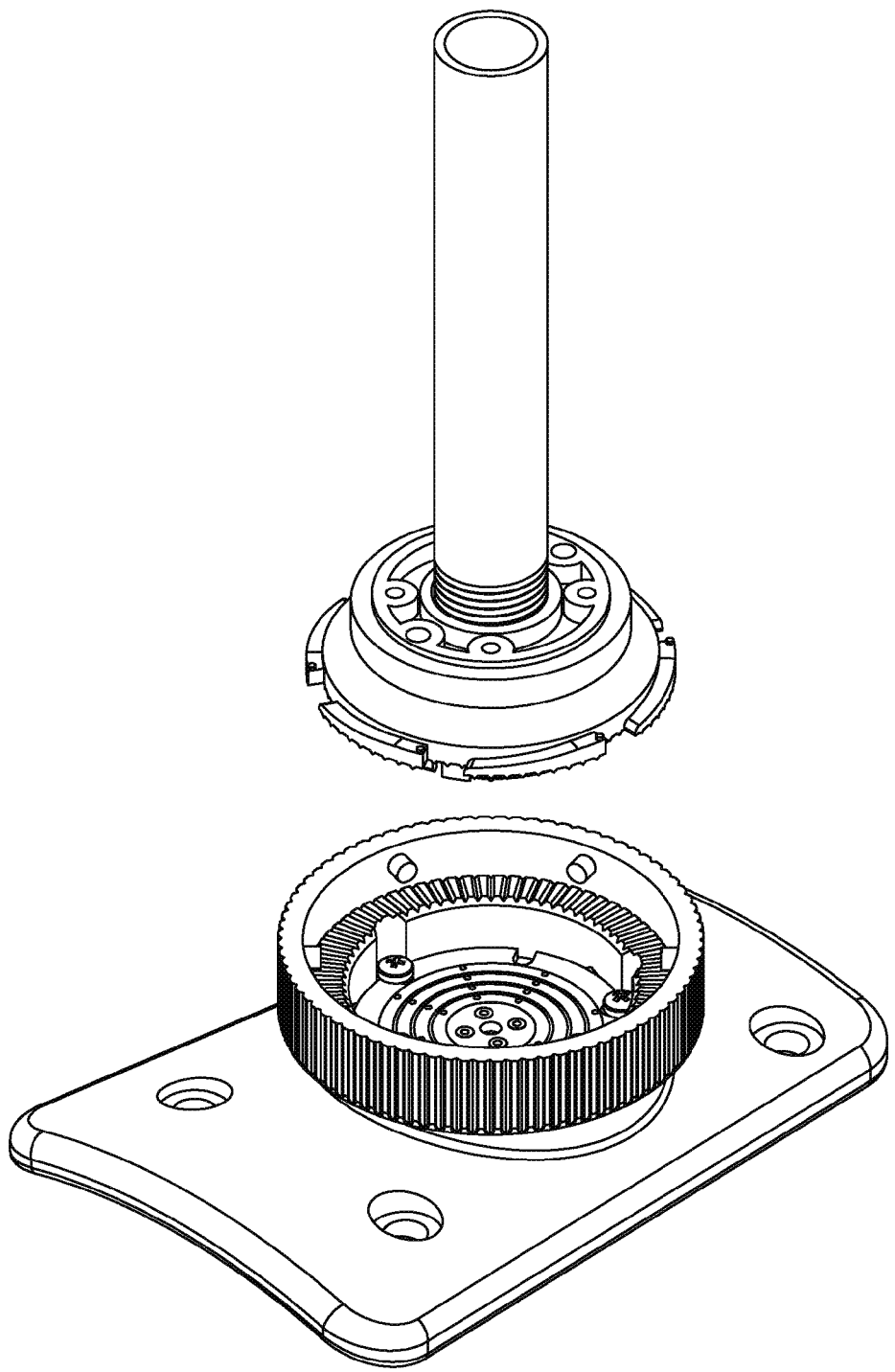

FIGS. 31-33 depict further alternative embodiments of the mounting member 110 wherein the mounting member is configured to be attached to the support structure using a threaded connection (FIG. 31), saddle clamp (FIG. 32), or bayonet connection (FIG. 33). The mounting member (bayonet, threaded or saddle clamp embodiment) can be configured to attach directly to a pipe hanging from a ceiling or protruding from a floor.

The docking member 120 is attachable to the accessory. The docking member 120 may be a bracket or base plate 121 that attaches to the accessory. The base plate 121 can be attached to the accessory with a fastener (e.g. nuts and bolts, screw, and so forth). The docking member 120 also includes a second connector 122. The second connector 122 is configured to be releasably secured to the first connector 114. In one embodiment, the first connector 114 and second connector 122 may be secured together by a quick release mechanism 130, which permits the mounting member 110 to releasably attach to the docking member 120. This allows the accessory to be quickly attached or detached form the mounting member 110. The quick release mechanism 130 may be configured to be operated by hand, which eliminates the need for special tools to detach the docking member 120 from the mounting member 110. Simply loosening the quick release mechanism 130 can allow the docking member 120 to rotate 360 degrees without completely detaching it. Alternatively, the quick release mechanism 130 can be completely loosened and detached from the mounting member 110.

For example, as shown in FIG. 7, the quick release mechanism 130 can be a saddle clamp having a fastener such as a thumbscrew, clip, and so forth. The quick release mechanism 130 may also include a locking tab or keeper 131 that helps to prevent the thumbscrew 132 from coming loose or undone when subjected to vibration. A safety clip 133 can also be used to further secure the thumbscrew 132. A person could simply loosen (tighten) the thumb screw by hand to detach (attach) the docking member 120 from the mounting member 110. In an alternate embodiment, the quick release mechanism 130 could be a set of notches and corresponding grooves configured to releasably secure the docking member 120 to the mounting member 110. The notches may be located on the docking member 120 and the grooves may be located on mounting member 110, or vice versa.

Figure 25:
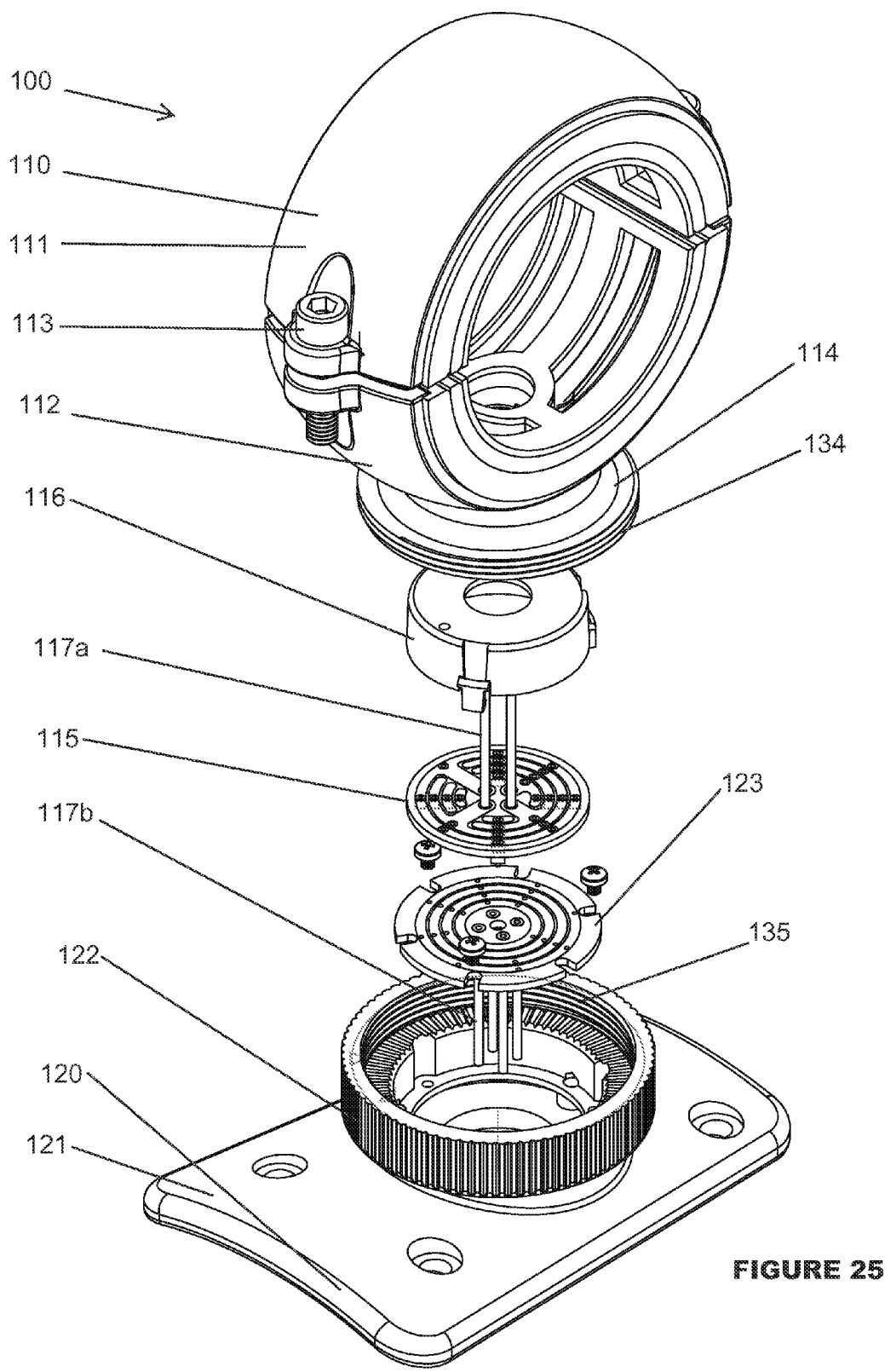
FIGS. 25-26 illustrate an embodiment of an accessory mounting assembly in accordance with aspects of this invention.
Figure 26:
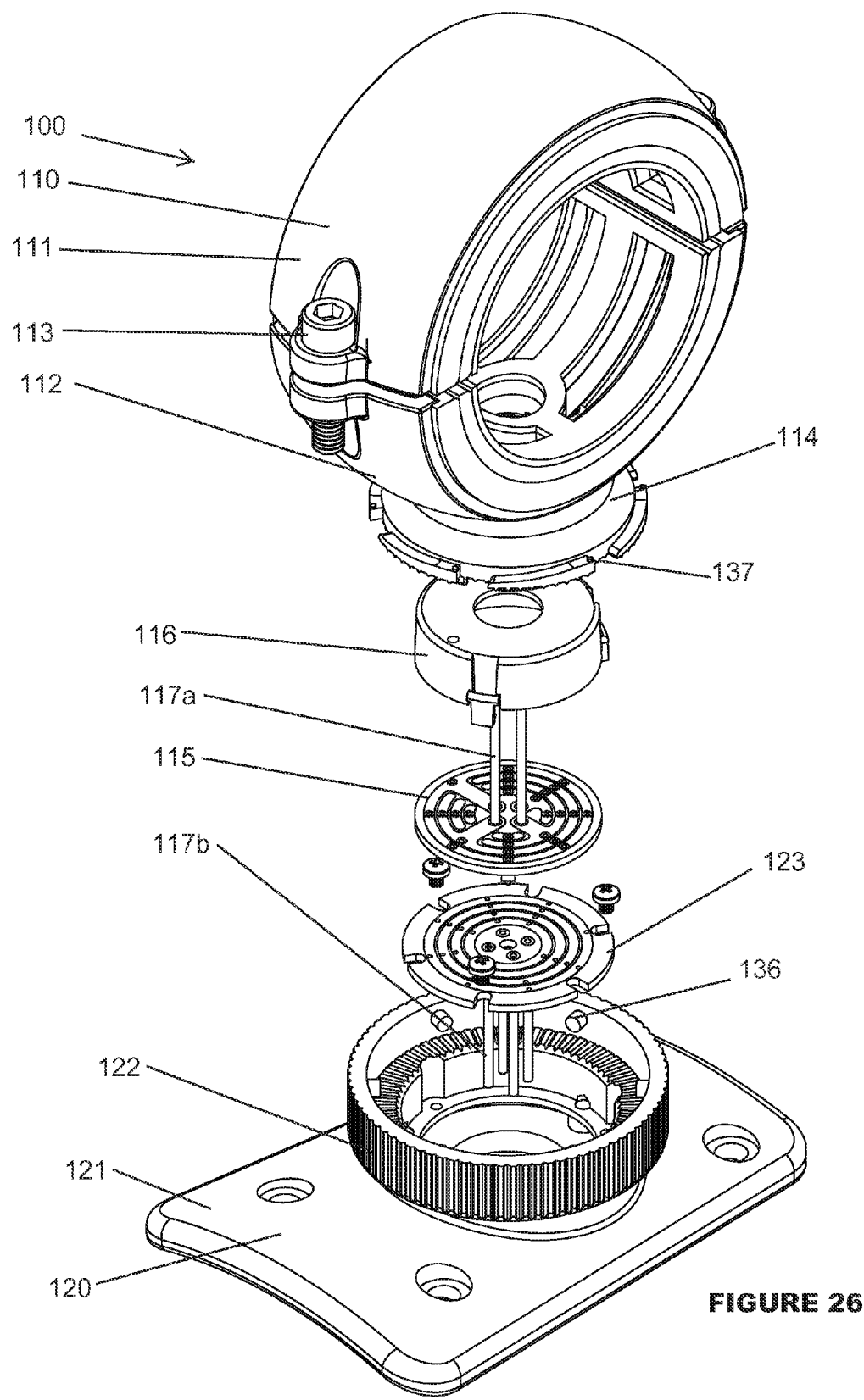
Figure 27:
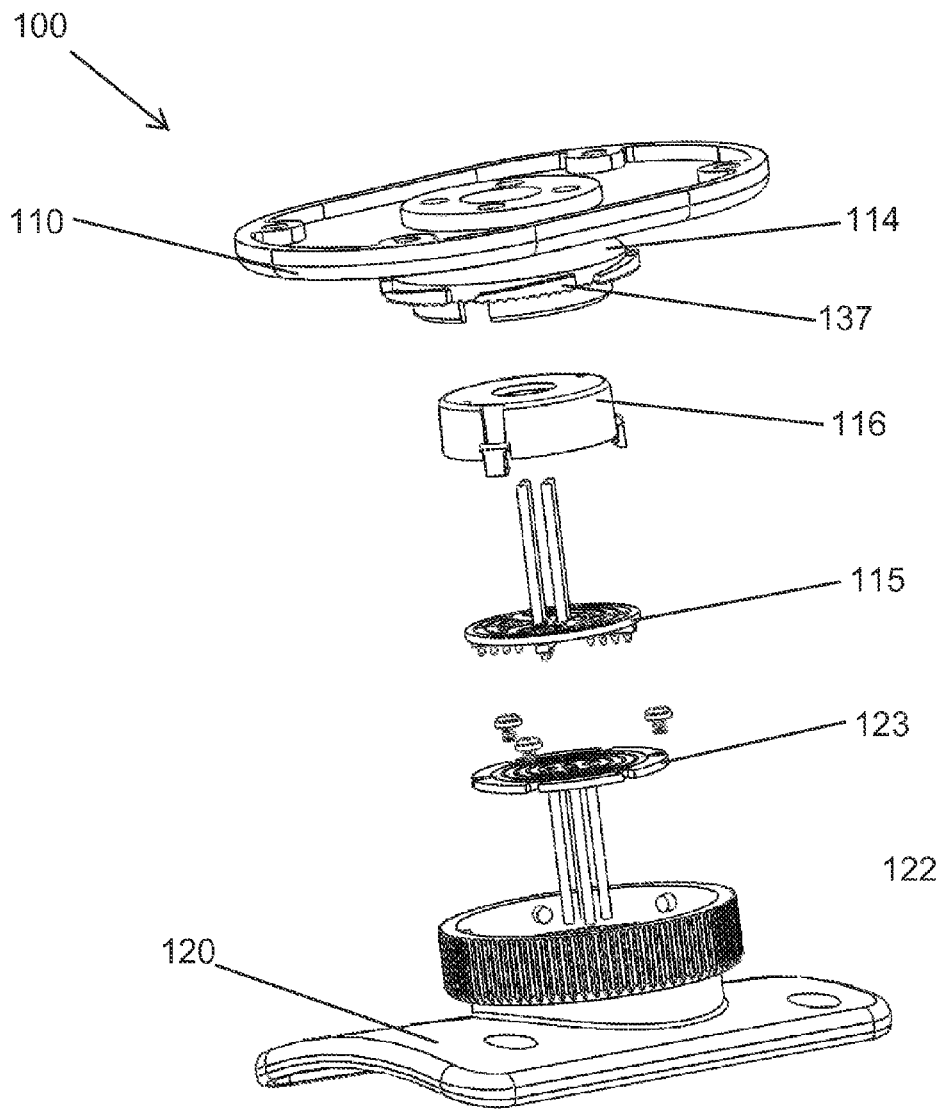
FIG. 27 illustrates an exploded view of an embodiment having a bayonet connection.
Figure 28:
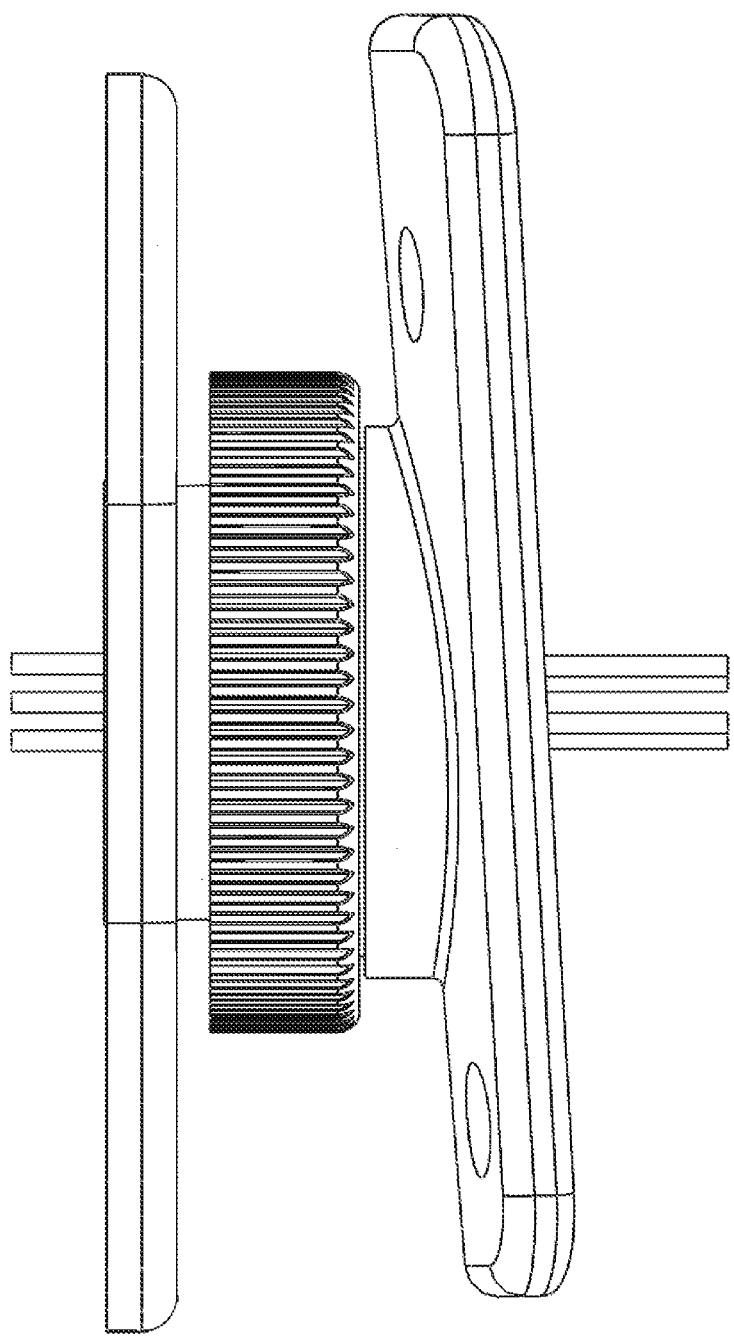
FIG. 28 illustrates a side view of FIG. 27.
Figure 29:
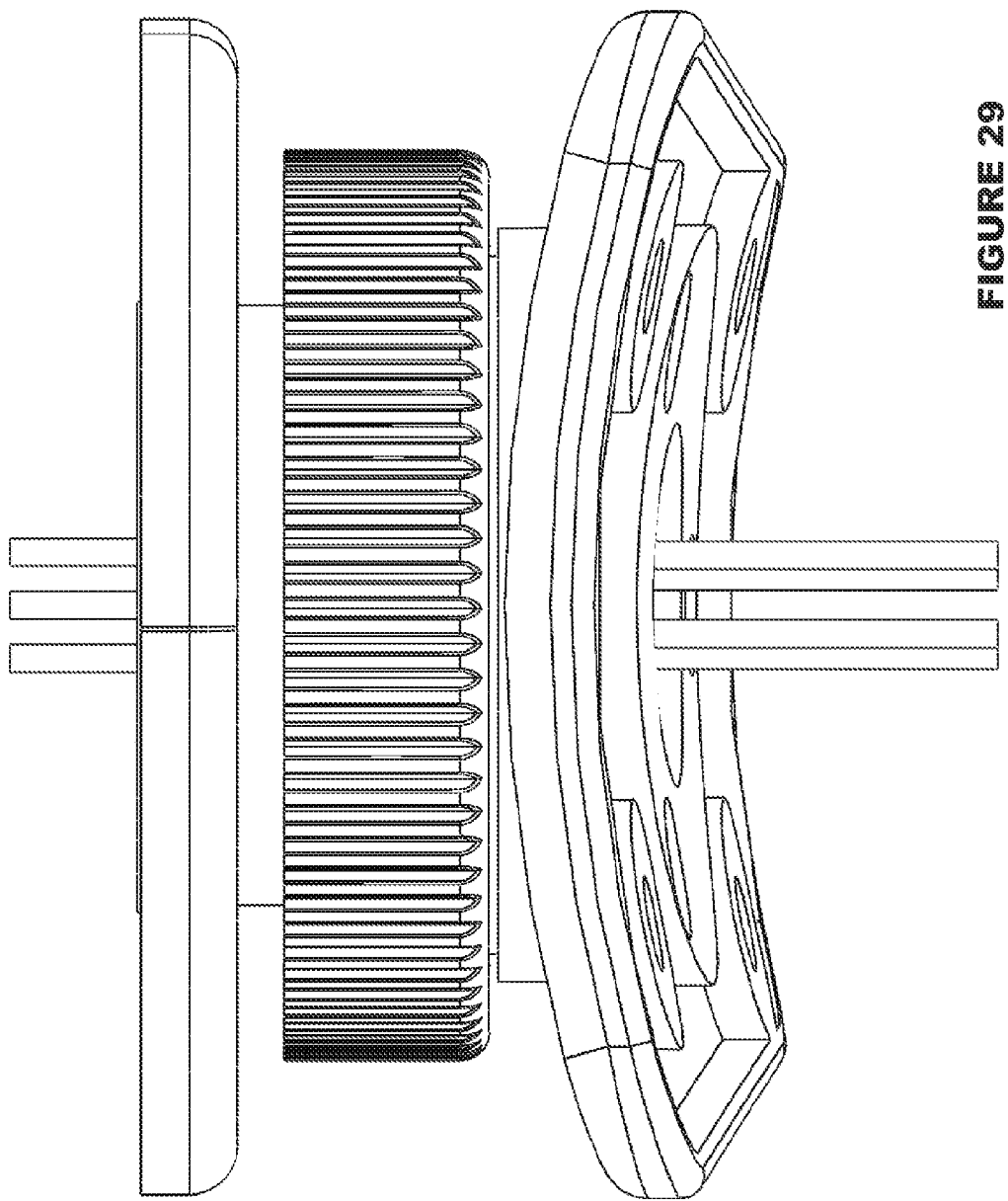
FIG. 29 illustrates a front view of FIG. 27.
Figure 30:
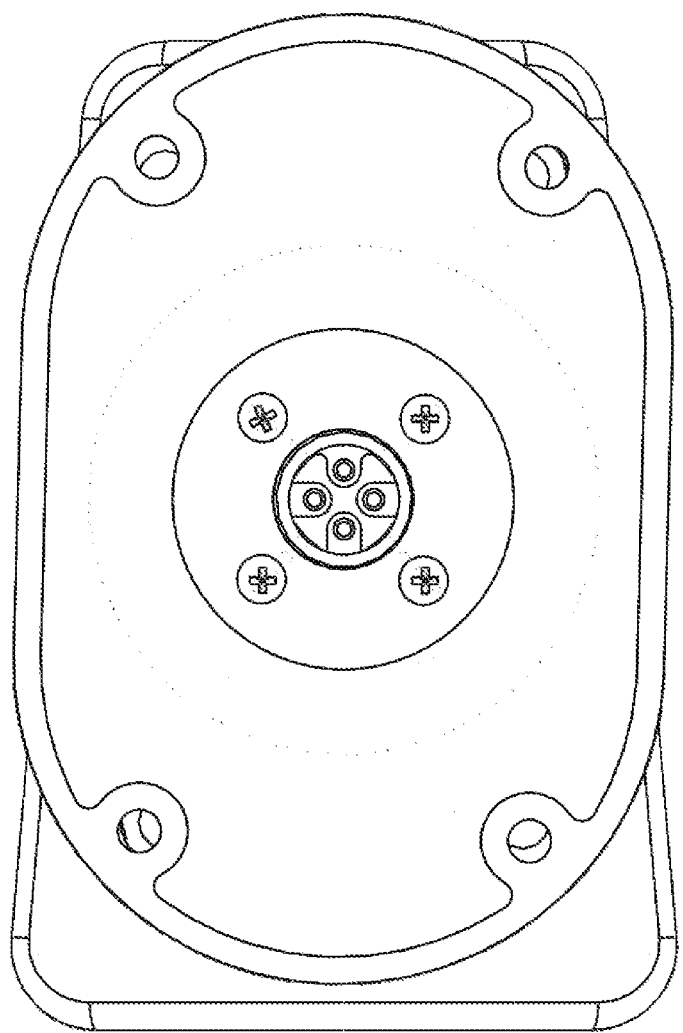
FIG. 30 illustrates a top view of FIG. 27.

Alternatively, the quick release mechanism 130 can be a threaded connection (FIG. 25) or a bayonet connection (FIG. 26). As shown in FIG. 25, the threaded connection is a fastening mechanism that releasably secures the docking member to the mounting member. The threaded connection typically comprises a male connection 134 having spiral ridges configured to mate with a corresponding female connection 135. As shown in FIG. 26, the bayonet connection is a fastening mechanism that typically comprises a cylindrical male receptor with one or more radial pins 136, and a female receptor with matching slots(s) 137. Spring(s) can be used to keep the receptors locked together. As discussed above, simply loosening the quick release mechanism 130 can allow the docking member 120 to rotate 360 degrees without completely detaching it. Alternatively, the quick release mechanism 130 can be completely loosened and detached from the mounting member 110.

Figure 17B:
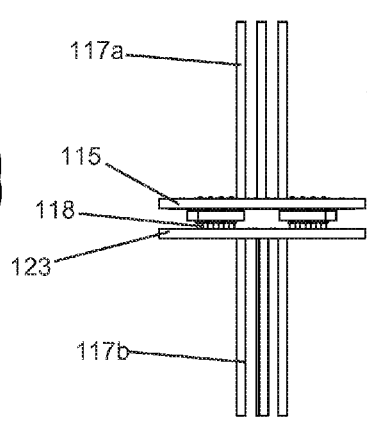
FIG. 17A-C illustrates an embodiment of electrical connectors in accordance with aspects of this invention.
Figure 17A:
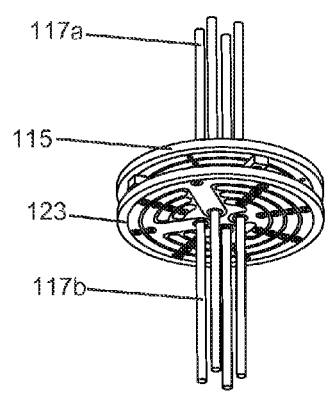
Figure 17C:
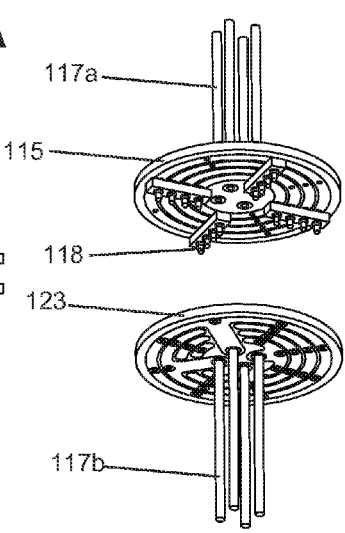

The accessory mounting assembly 100 also includes a signal or power commutator to permit a full 360° rotation of the accessory. In one embodiment shown in FIG. 7, the commutator comprises a mounting member electrical connector 115 and a docking member electrical connector 123. The surface of the mounting member electrical connector 115 may also have one or more signal or electrical lines 117a extending from its surface that can be operatively connected to an audio, video or electrical source. Similarly, the docking member electrical connector 123 may also include one or more signal electrical lines 117b extending from its surface that can be operatively connected to the accessory. As shown in FIGS. 17A-17C, the surface of the mounting member electrical connector 115 may include one or more stationary graphite or metal contacts (or brushes) 118 that contact the surface of the docking member 123. The one or more contacts 118 on the mounting member electrical connector 115 correspond to one or more traces on the surface of the docking member electrical connector 123. The contacts and traces permit the electrical connectors 115, 123 to be communicably coupled to each other. The traces may be metal rings or discs.

As the accessory and docking member 120 are rotated, the electrical current or signal is continually conducted through the stationary contacts 118 to the traces. Additional traces and contacts can be stacked along the axis of rotation if more than one electrical circuit is desired. In an alternate embodiment (not shown), the one or more traces can be located on the surface of the mounting member electrical connector 115 and the one or more contacts 118 can be located on the surface of the docking member electrical connector 123. In this alternate embodiment, the one or more traces can be stationary while the one or more contacts (or brushes) 118 rotate.

The mounting member 110 also includes an insert 116 for securing the mounting member electrical connector 115 to the mounting member 110, which holds the mounting member electrical connector 115 in position. Similarly, the docking member also includes an insert 124 for securing the docking member electrical connector 123 to the docking member 120, which holds the docking member electrical connector 123 in position. The inserts 116, 124 ensure that the contacts and traces of are aligned with one another. The inserts 116, 124 can be constructed of any material capable of substantially insulating the electrical connectors 115, 123 from outside interference (e.g. metal parts of the docking member or mounting member, if any). As shown in FIG. 7, the inserts 116, 124 may include clips that mate with corresponding notches provided on the members 110, 120.

Figure 19:
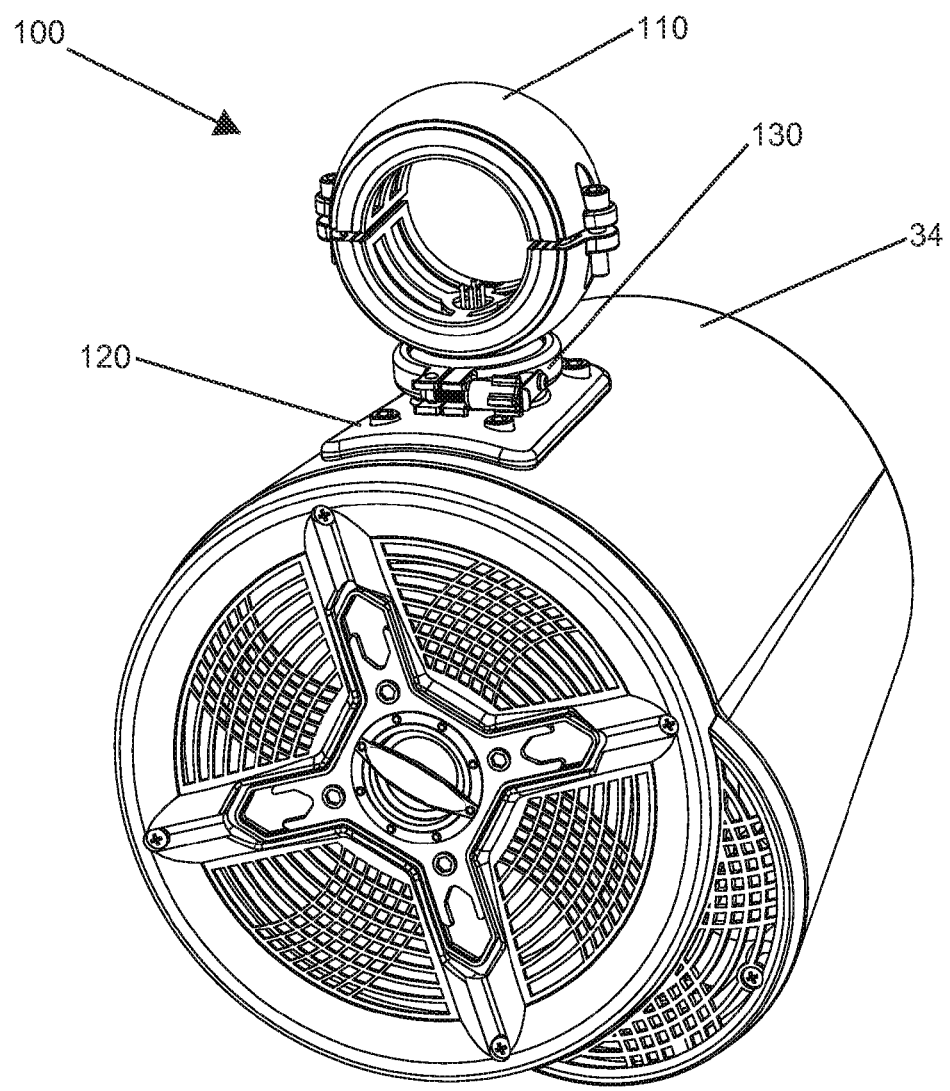
FIG. 19 illustrates an embodiment of the accessory mounting assembly secured to a speaker.
Figure 20:
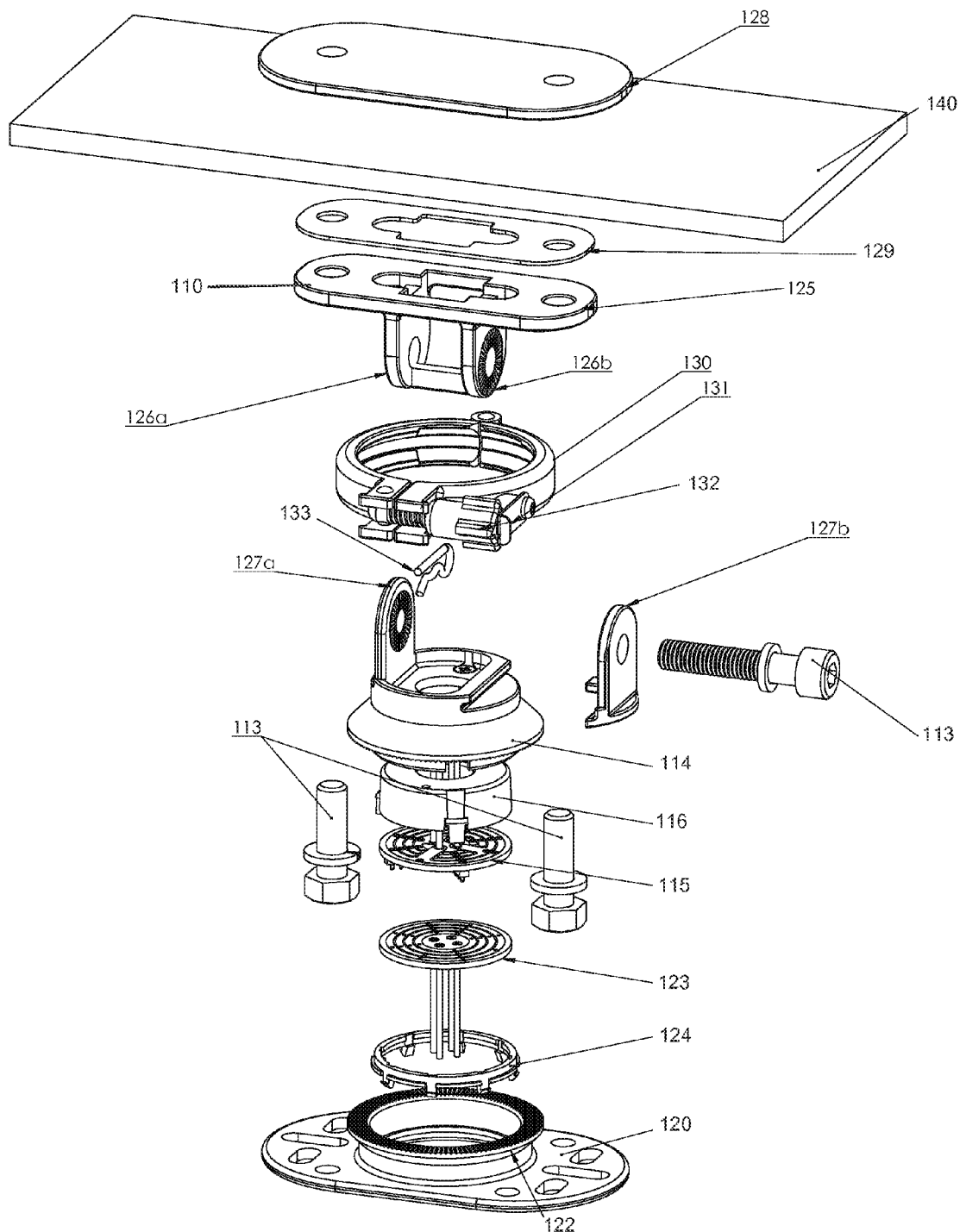
FIG. 20 is an exploded view of the embodiment shown in FIGS. 21-24
Figure 21:
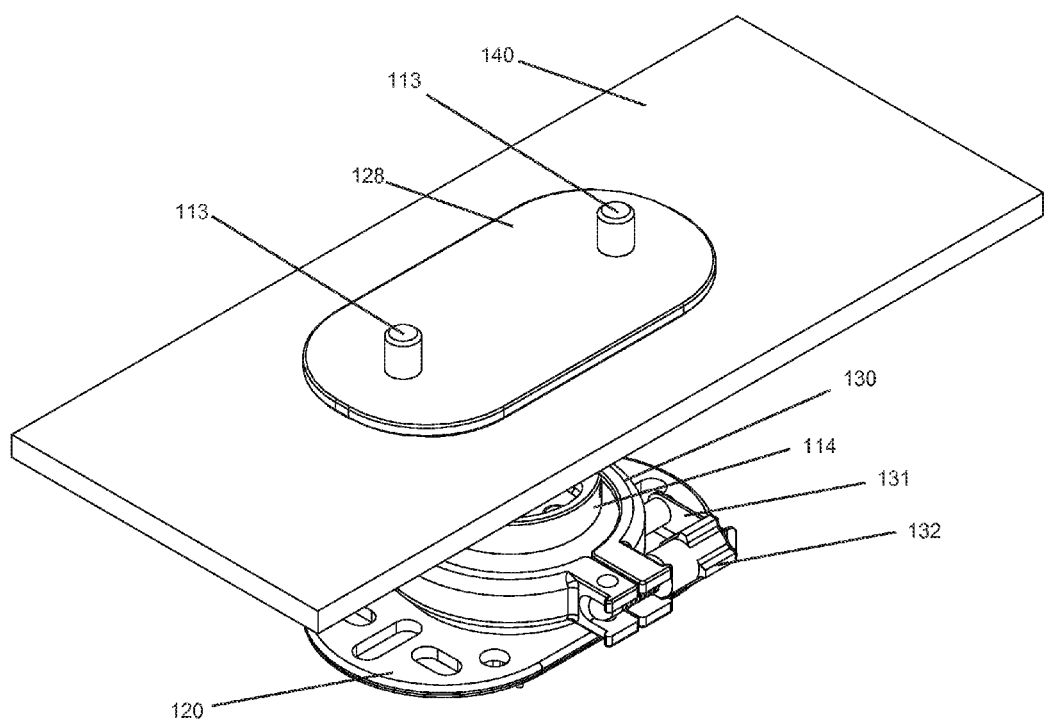
FIGS. 21-24 illustrate a perspective views an alternate embodiment of the accessory mounting assembly.
Figure 22:
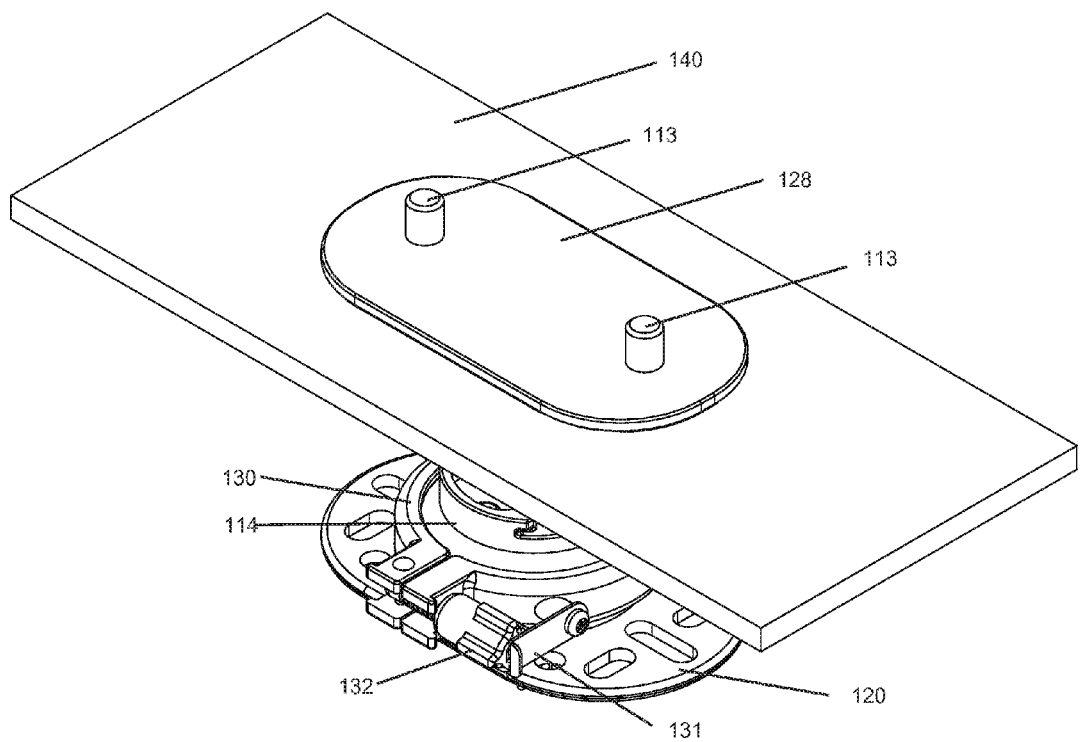
Figure 23:
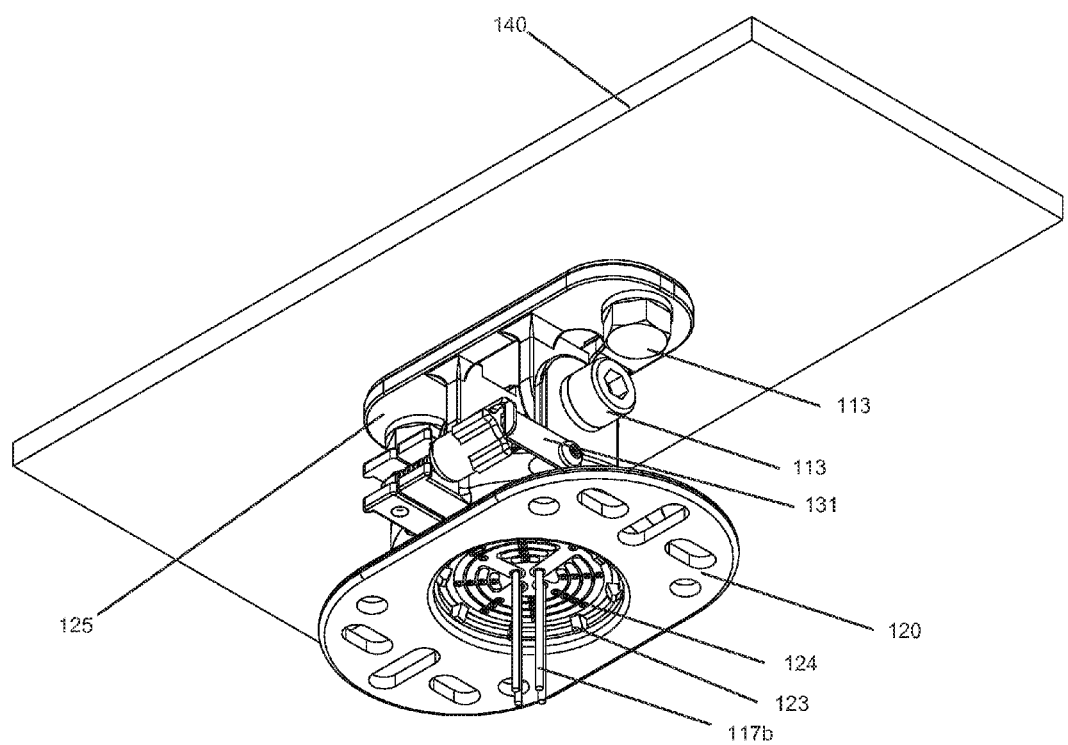
Figure 24:
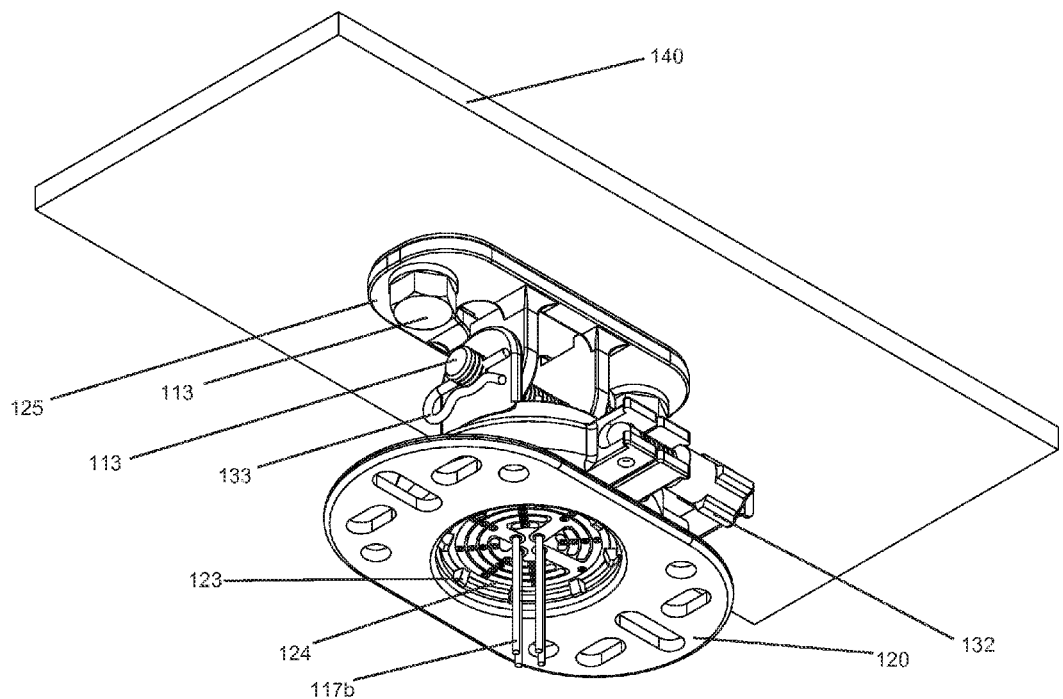

In operation, the mounting member electrical connector 115 is secured to the mounting member 110 using the mounting member insert 116. The docking member electrical connector 123 is secured to the docking member 120 using the docking member insert 124. The mounting member 110 is attached to a support structure by the clamp or base plate using fasteners. The docking member 120 is attached to the accessory using fasteners. As shown in FIG. 19, the docking member 120 can then be attached to the mounting member 110 by securing the second connector 122 and the first connector 123 together with a quick release mechanism 130.

Figure 18:
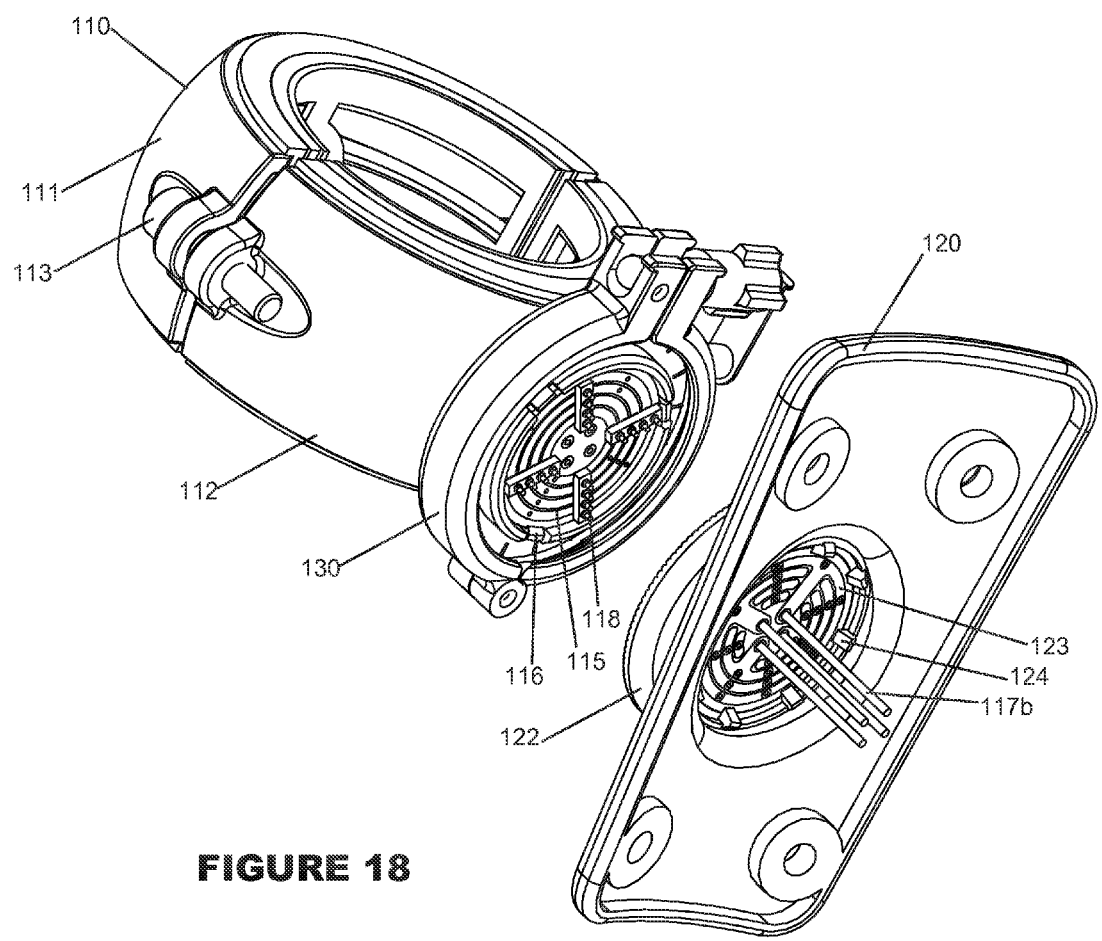
FIG. 18 illustrates the docking member detached from the mounting member.

As shown in FIG. 18, the docking member 120 is releasably attached to the mounting member 110. The accessory can be detached (or attached) from the support structure by loosening or unlocking (or tightening or locking) the quick release mechanism 130. In addition, the accessory can be rotated in a desired direction. For example, where the support structure is a boat tower on a boat, the accessory can be directed toward the dock or other area so that music or light may be directed towards people in those areas.

Figure 8:
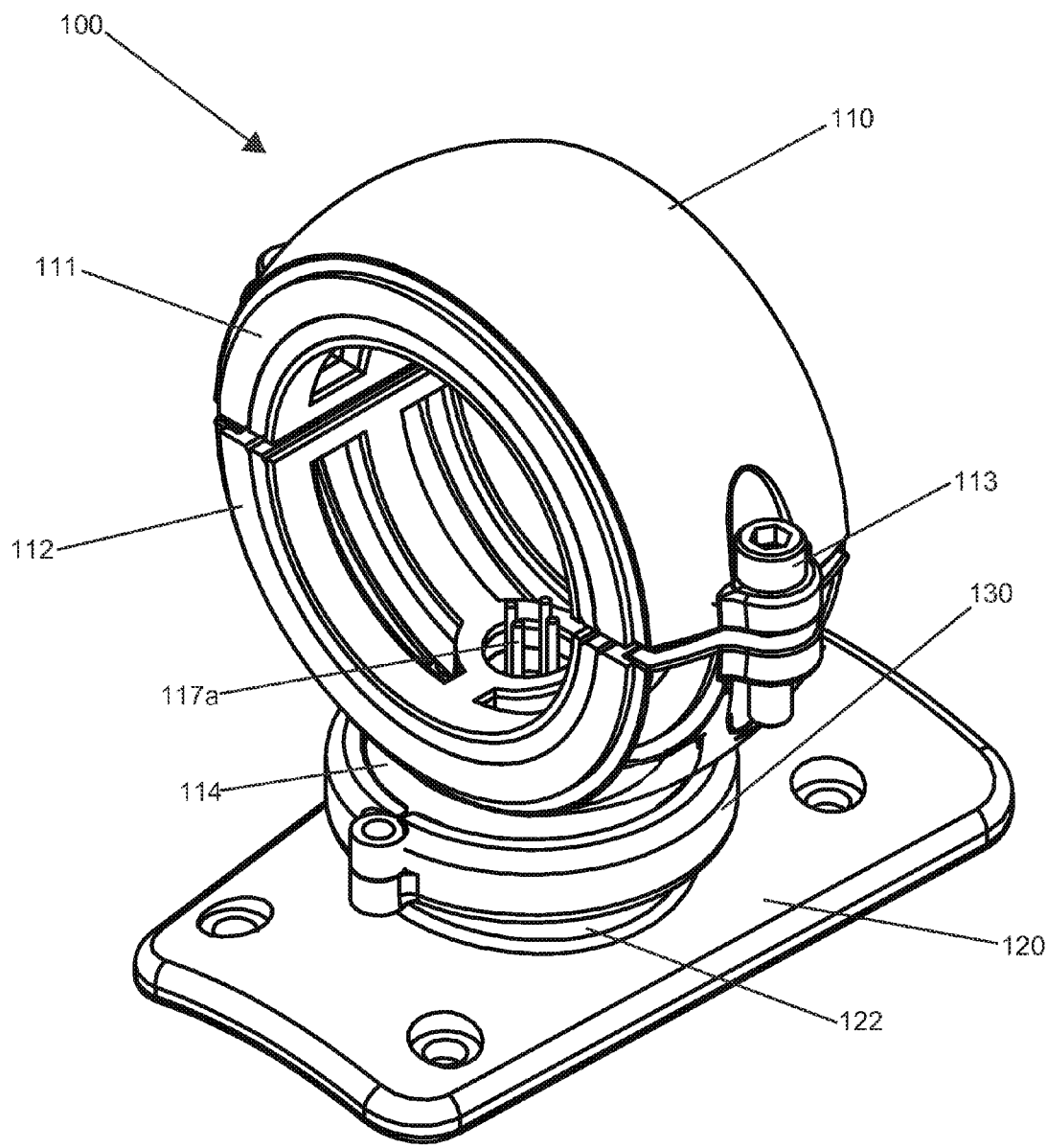
FIG. 8 is a perspective view of an embodiment of an accessory mounting assembly in accordance with aspects of this invention.
Figure 15:
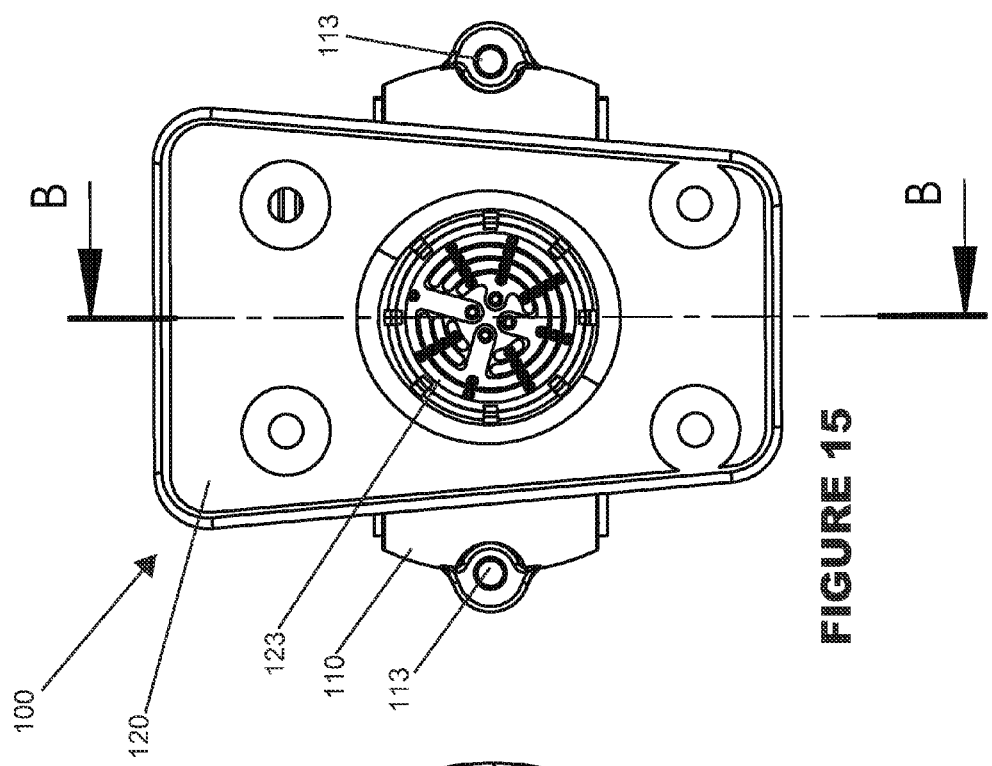
FIG. 15 is a bottom view of FIG. 8.
Figure 16:
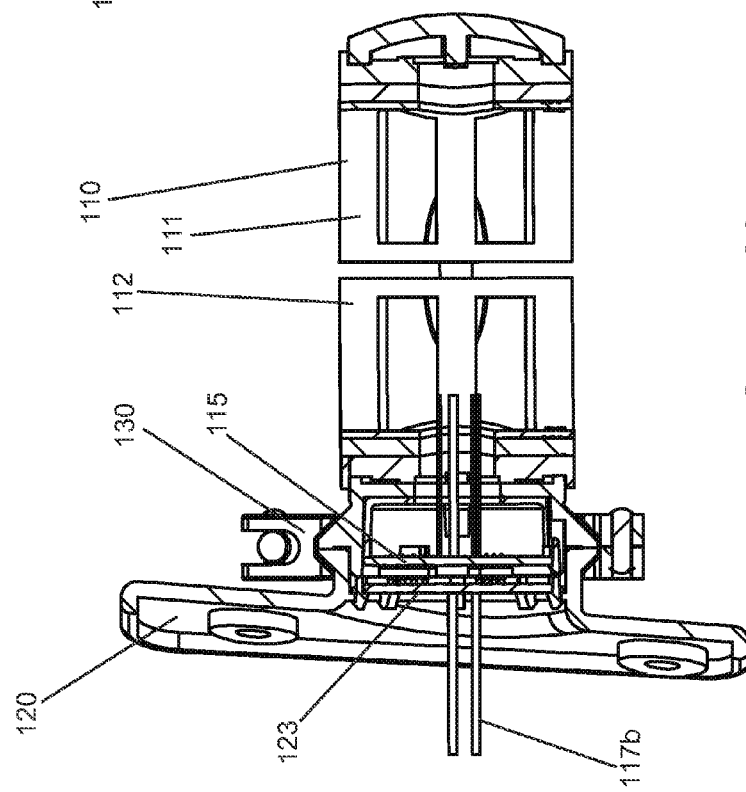
FIG. 16 is a cross-sectional view along B-B of FIG. 15.

As shown in FIG. 7-8 and FIG. 19, the one or more signal or electrical output lines 117a from the mounting member electrical connector 115 are operatively connected to an audio, video or electrical source. Similarly, as shown in FIG. 7-8 and FIG. 18, the one or more signal or electrical output lines 117b from the docking member electrical connector 123 are operatively connected to the accessory. This permits audio, video or electricity to be transmitted to the accessory. If the accessory is a camera, the output from the camera may be transmitted to a recording device using the one or more signal or electrical output lines 117a, 117b.

Any reference to patents, documents and other writings contained herein shall not be construed as an admission as to their status with respect to being or not being prior art. Although the present invention and its advantages have been described in detail, it is understood that the array of features and embodiments taught herein may be combined and rearranged in a large number of additional combinations not directly disclosed, as will be apparent to one having ordinary skill in the art.

Moreover, it should be understood that various changes, substitutions and alterations can be made herein without departing from the spirit and scope of the invention as defined by the following claims. These and other alternate embodiments of this invention are clear from the foregoing description of embodiments of the invention. It is the intent of the inventor for his invention as defined by the following claims to cover not only the specific embodiments described but also those other alternate embodiments that are obvious from the described general embodiments.

What is claimed is:

1. An accessory mounting assembly comprising:
   a. a mounting member attachable to a support structure, wherein the mounting member comprises a mounting member electrical connector;
   b. a docking member releasably attached to the mounting member, wherein the docking member comprises a docking member electrical connector communicably coupled to the mounting member electrical connector;
   c. a quick release mechanism for releasably securing the mounting member to the docking member; and
   d. an accessory operatively attached to the docking member.

2. The accessory mounting assembly of claim 1 wherein the assembly is configured to permit the accessory to pan, rotate, or tilt in a desired direction.

3. The accessory mounting assembly of claim 2 wherein the mounting member electrical connector is configured to be operatively connected to an audio, video or electrical source.

4. The accessory mounting assembly of claim 1 wherein the quick release mechanism comprises a threaded connection.

5. The accessory mounting assembly of claim 4 wherein the docking member electrical connector is configured to be operatively connected to the accessory.

6. The accessory mounting assembly of claim 5 wherein the accessory comprises one or more speakers, lights, cameras, combinations thereof.

7. The accessory mounting assembly of claim 6 wherein the surface of the mounting member electrical connector includes one or more traces that correspond to one or more contacts on the docking member electrical connector.

8. The accessory mounting assembly of claim 6 wherein the surface of the docking member electrical connector includes one or more traces that correspond to one or more contacts on the mounting member electrical connector.

9. The accessory mounting assembly of claim 6 wherein:
   a. the mounting member has a first connector;
   b. the docking member has a second connector, and c. wherein the connectors are secured together by the quick release mechanism.

10. The accessory mounting assembly of claim 9 wherein:
a. the mounting member further comprises a mounting member insert;
b. the docking member further comprises a docking member insert; and
c. wherein the inserts are configured to align the electrical connectors.

11. The accessory mounting assembly of claim 10 wherein the assembly is configured to permit 360° rotation of the accessory.

12. The accessory mounting assembly of claim 11 wherein the accessory comprises one or more speakers, lights, cameras, combinations thereof.

13. The accessory mounting assembly of claim 12 wherein the mounting member is a clamp for attaching the assembly to the support structure.

14. The accessory mounting assembly of claim 12 wherein the mounting member is a base plate for attaching the assembly to the support structure.

15. The accessory mounting assembly of claim 1 wherein the quick release mechanism comprises a bayonet connection.

16. The accessory mounting assembly of claim 1 wherein the quick release mechanism comprises a saddle clamp.

17. An accessory mounting assembly comprising:
a. a mounting member attachable to a support structure, wherein the mounting member comprises:
   i. a first connector;
   ii. a mounting member electrical connector configured to be operatively connected to an audio, video or electrical source; and
   iii. a mounting member insert for securing the mounting member electrical connector to the first connector;
b. a docking member releasably attached to the mounting member, wherein the docking member comprises:
   i. a second connector;
   ii. a docking member electrical connector communicably coupled to the mounting member electrical connector, wherein the electrical connectors are coupled by one or more traces that correspond to one or more grooves; and
   iii. a docking member insert for securing the docking member electrical connector to the second connector;
c. an accessory operatively attached to the docking member electrical connector and configured to pan, rotate, or tilt in a desired direction; and
d. a quick release mechanism for releasably securing the first connector to the second connector.

18. The accessory mounting assembly of claim 17 wherein the quick release mechanism comprises a bayonet connection.

19. The accessory mounting assembly of claim 17 wherein the quick release mechanism comprises a threaded connection.

20. The accessory mounting assembly of claim 17 wherein the quick release mechanism comprises a saddle clamp.

* * * * *